United States Patent
Abe et al.

(10) Patent No.: US 10,491,799 B2
(45) Date of Patent: Nov. 26, 2019

(54) FOCUS DETECTION APPARATUS, FOCUS CONTROL APPARATUS, IMAGE CAPTURING APPARATUS, FOCUS DETECTION METHOD, AND STORAGE MEDIUM

(71) Applicant: CANON KABUSHIKI KAISHA, Tokyo (JP)

(72) Inventors: Hiroshi Abe, Kawasaki (JP); Takashi Ichimiya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 207 days.

(21) Appl. No.: 15/620,106

(22) Filed: Jun. 12, 2017

(65) Prior Publication Data
US 2018/0007253 A1    Jan. 4, 2018

(30) Foreign Application Priority Data

Jun. 17, 2016  (JP) .................................. 2016-120384
Feb. 28, 2017  (JP) .................................. 2017-036948

(51) Int. Cl.
*H04N 5/232*  (2006.01)
*H04N 5/225*  (2006.01)

(52) U.S. Cl.
CPC ....... *H04N 5/23212* (2013.01); *H04N 5/2254* (2013.01); *H04N 5/232122* (2018.08)

(58) Field of Classification Search
CPC ............ H04N 5/23212; H04N 5/2254; H04N 5/232122; H04N 5/232127
See application file for complete search history.

(56) References Cited

U.S. PATENT DOCUMENTS

| 5,760,896 | A  | * | 6/1998 | Suzuki ..................... G01C 3/24 356/3.08 |
| 2006/0018650 | A1 | * | 1/2006 | Ichimiya ................. G03B 13/36 396/104 |
| 2008/0208506 | A1 | * | 8/2008 | Kuwata .................. G01D 18/00 702/104 |
| 2010/0045849 | A1 | * | 2/2010 | Yamasaki ................ G03B 3/10 348/349 |
| 2012/0133787 | A1 | * | 5/2012 | Yamaguchi .......... H04N 5/2258 348/208.6 |
| 2012/0274837 | A1 | * | 11/2012 | Yamasaki .............. G02B 7/285 348/360 |

FOREIGN PATENT DOCUMENTS

| JP | 11-191867 A |   | 7/1999 |
| JP | 2006072084 A | * | 3/2006 |

* cited by examiner

*Primary Examiner* — Nhan T Tran
(74) *Attorney, Agent, or Firm* — Cowan, Liebowitz & Latman, P.C.

(57) ABSTRACT

A focus detection apparatus includes a first acquirer configured to acquire a first distance as a distance between a pair of object images in the first direction based on the pair of phase difference image signals, a second acquirer configured to acquire a correction value corresponding to a second distance as the distance in the second direction, and a calculator configured to calculate the phase difference using the first distance and the correction value.

21 Claims, 18 Drawing Sheets

FOCUS DETECTION APPARATUS, FOCUS CONTROL APPARATUS, IMAGE CAPTURING APPARATUS, FOCUS DETECTION METHOD, AND STORAGE MEDIUM

BACKGROUND OF THE INVENTION

Field of the Invention

The present invention relates to a focus detection technology using a focus detection element having two-dimensionally arranged photoelectric conversion pixels in an image capturing apparatus, such as a single-lens reflex camera.

Description of the Related Art

Some image capturing apparatuses detect a focus state or a defocus amount of an image capturing optical system by a phase difference detection method. The phase difference detection method divides a light flux that has passed the image capturing optical system, calculates a phase difference as a shift amount of a pair of phase difference image signals generated by photoelectrically converting, through focus detection elements, the pair of object images formed by the divided light fluxes, and calculates a defocus amount based on the phase difference. Another image capturing apparatus includes a plurality of two-dimensionally arranged photoelectric converts (pixels) as the focus detection elements. The image capturing apparatus that provides the focus detection by the phase difference detection method includes a secondary imaging optical system dedicated for the phase difference detection used to form the object image on the focus detection element.

When the object image formed on the focus detection element deforms in the pixel arrangement direction due to the aberrations of the image capturing optical system and the secondary imaging optical system, a pair of phase difference signals become signals generated by photoelectrically converting mutually different areas in the object images. As a result, it is difficult to precisely detect the phase difference between the pair of phase difference image signal.

As a solution for this problem, Japanese Patent Laid-Open No. 11-191867 discloses an image capturing apparatus configured to correct the influence of the aberration by providing a light shield layer corresponding to the aberration in the secondary imaging optical system, to the pixel of the focus detection element.

However, due to an environment of the image capturing optical system and the secondary imaging optical system, such as an assembly error, a component dimensional tolerance, a temperature, and a humidity in the image capturing (referred to as an "image capturing environment" hereinafter), a pair of object images shift relatively to each other in a direction orthogonal to a direction in which a focus state in an image capturing optical system displaces with a correlation (referred to as a "correlation direction" hereinafter). As a result, even when a focus detection element includes the light shift layer as disclosed in JP 11-191867, a pair of phase difference image signals become signals generated by photoelectrically converting mutually different areas in the object images and the phase difference cannot be precisely detected.

SUMMARY OF THE INVENTION

The present invention provides a focus detection apparatus that can restrain the focus detection precision from decreasing when a pair of object images relatively shift in a direction orthogonal to a correlation direction due to an aberration, an assembly error, and an image capturing environment.

A focus detection apparatus according to one aspect of the present invention is configured to detect a focus state of an image capturing optical system by using a phase difference between a pair of phase difference image signals obtained by photoelectrically converting, through a focus detection element, a pair of object images which are formed by dividing a light flux from an image capturing optical system. The focus detection element including a plurality of photoelectric converters that are two-dimensionally arranged in a first direction in which a distance between the pair of object images changes according to the focus state, and a second direction orthogonal to the first direction. The focus detection apparatus includes a first acquirer configured to acquire a first distance as the distance in the first direction based on the pair of phase difference image signals, a second acquirer configured to acquire a correction value corresponding to a second distance as the distance between the pair of object images in the second direction, and a calculator configured to calculate the phase difference using the first distance and the correction value.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

First Embodiment

Figure 1:
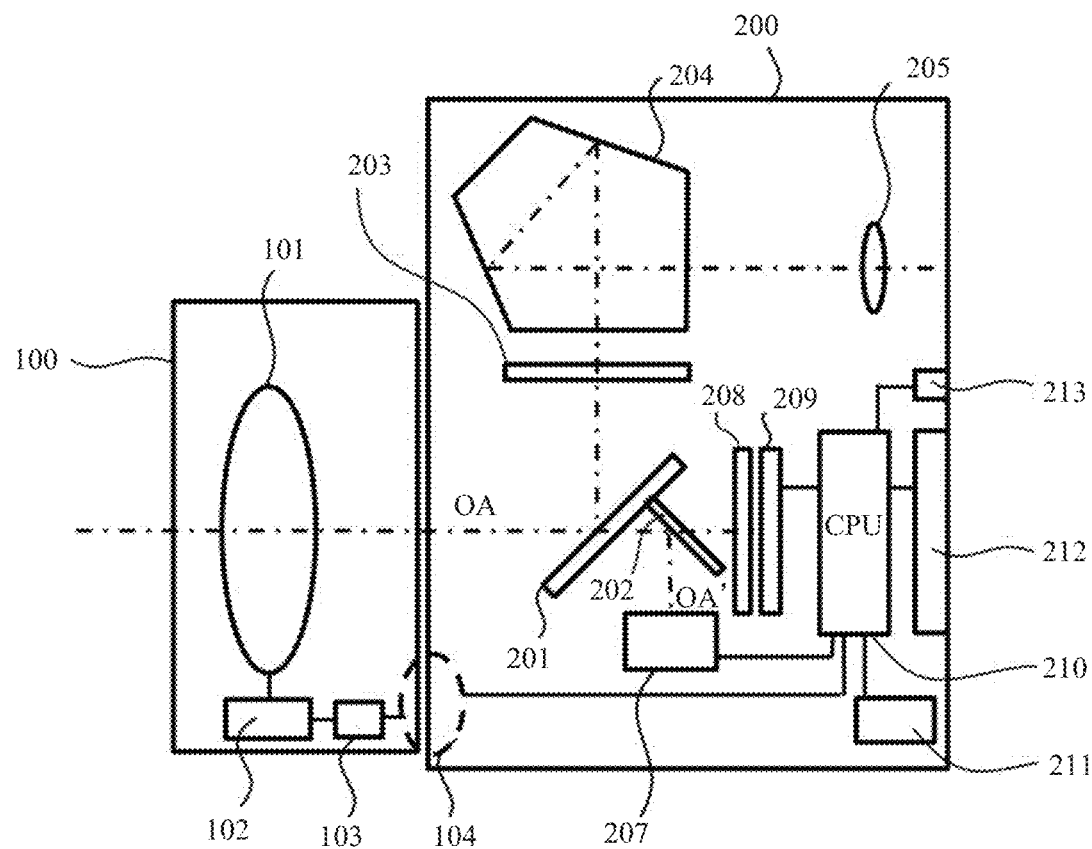
FIG. 1 is a block diagram of a configuration of an image capturing apparatus according to a first embodiment.

FIG. 1 illustrates a configuration of an image capturing apparatus 200 that includes a focus detection apparatus according to a first embodiment of the present invention. An image capturing lens (interchangeable lens) 100 is detachably attached to the image capturing apparatus 200 via a lens attachment mechanism in an unillustrated mount unit. The mount unit includes an electric contact unit 104. The image capturing lens 100 includes an image capturing optical system that includes a focus lens 101, an unillustrated magnification varying lens, an unillustrated aperture stop, etc.

A light flux from an unillustrated object is guided to a main mirror 201 in the image capturing apparatus 200 through the image capturing optical system. The main mirror 201 is obliquely disposed relative to the optical axis in an image capturing optical path as illustrated, and movable between a first position used to guide the light flux from the object to a viewfinder optical system located above and a second position outside the image capturing optical path.

The main mirror 201 includes a half-mirror part at its center part, and when the main mirror 201 is located at the first position, the part of the light flux from the object transmits through the half-mirror part. The transmitting the light flux is reflected on a sub mirror 202 behind the main mirror 201 and guided to a focus detection optical unit 207. A detailed configuration of the focus detection optical unit 207 will be described later. On the other hand, the light flux reflected on the main mirror 201 is imaged on a focus plate 203 disposed at a position optically conjugate with an image sensor 209. The light flux (object image) that has been diffused by and transmitted through the focus plate 203 is converted into an erect image by a penta-dach prism 204. The erect image is enlarged by an eyepiece 205 and observed by a user.

When the main mirror 201 retreats to the second position, the sub mirror 202 is folded on the main mirror 201 and retreats to the outside of the image capturing optical path. The light flux from the image capturing lens 101 passes a focal plane shutter 208 that serves as a mechanical shutter and reaches an image sensor 209. The focal plane shutter 208 restricts a light amount incident on the image sensor 209. The image sensor 209 includes a photoelectric conversion element, such as a CCD and a CMOS, configured to photoelectrically convert the object image formed by the image capturing lens 101 and to output an electric signal.

A camera CPU 210 serves as a controller configured to control a variety of operations of the image capturing apparatus 200 and the image capturing lens 100. The camera CPU 210 communicates with the lens CPU 103 in the image capturing lens 100 via the electric contact unit 104.

The camera CPU 210 calculates a defocus amount of the image capturing optical system by using a pair of phase difference image signals generated with the output signal from the focus detection optical unit 207, and sends a focus driving command containing the defocus amount to the lens CPU 103. The lens CPU 103 drives the focus lens 101 in a direction of the optical axis OA in the image capturing optical system by controlling a lens driving mechanism 102 according to the focus driving command. The lens driving mechanism 102 includes a stepping motor as a driving source. This configuration provides a phase difference autofocus (AF) that detects a focus state by the phase difference detection method and drives the focus lens.

The camera CPU 210 serves as a focus detection apparatus that includes a first acquirer, a second acquirer, and a calculator, and a focus control apparatus that includes a controller.

The camera CPU 210 is connected to an EEPROM (storage unit) 211 configured to store a parameter necessary to control the image capturing apparatus 200, camera identification information used to identify an individual image capturing apparatus 200, a correction value for an image capturing parameter, etc.

The camera CPU 210 generates image data through a variety of processes to an output signal (image signal) from the image sensor 209. A display apparatus 212 includes a liquid crystal device, etc., and displays the image data generated by the camera CPU 210 and user set information.

The camera CPU 210 is connected to an operation detector 213 configured to detect a user operation. The operation detector 213 detects the user operation applied to an operation unit, such as an unillustrated release button and an AF start button.

Figure 2:
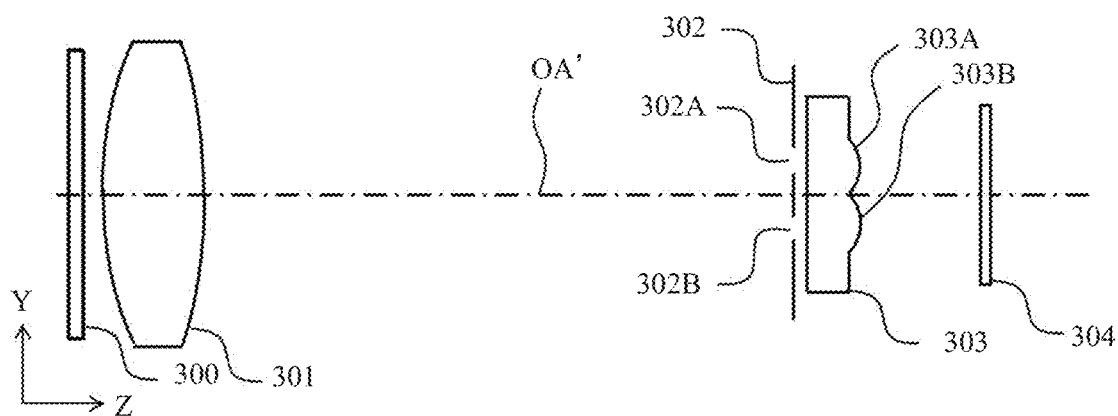
FIG. 2 is a sectional view of a configuration of a focus detection optical unit according to the first embodiment.
Figure 3:
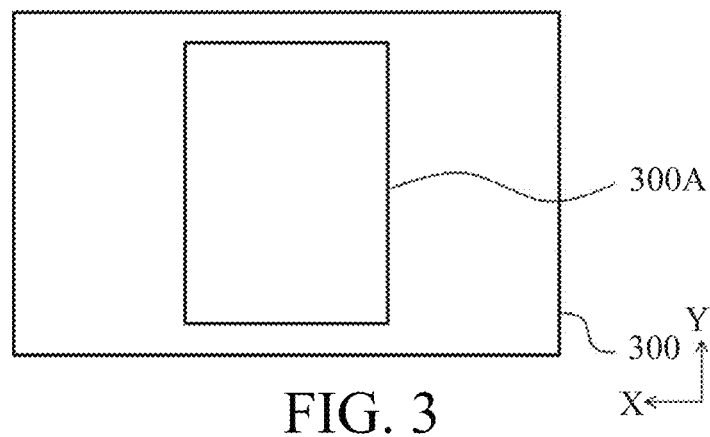
FIG. 3 is a plane view of an aperture mask according to the first embodiment.

FIG. 2 illustrates a YZ section of the focus detection optical unit 207. FIG. 3 illustrates an XY plane of an aperture mask 300. A Z-axis extends in the same direction as that of an optical axis OA' in the focus detection optical unit 207. An X-axis extends in a longitudinal direction of an aperture 300A in an aperture mask 300. A Y-axis extends in a direction orthogonal to the longitudinal direction.

The focus detection optical unit 207 includes, in order along the optical axis OA', the aperture mask 300, a field lens 301, a multi-aperture stop 302, a re-imaging lens unit 303, and a focus detection element 304.

The aperture mask 300 includes, at its center as illustrated in FIG. 3, the rectangular aperture 300A configured to limit a light flux that has passed the image capturing optical system. The aperture mask 300 is disposed on or near an expected image plane of the image capturing optical system. The multi-aperture stop (diaphragm) 302 includes a thin plate with two or a pair of diaphragm apertures 302A and 302B. The field lens 301 images the diaphragm aperture shape of the multi-aperture stop 302 on or near the pupil plane in the image capturing optical system. This configuration divides the light flux that has passed the image capturing optical system.

The re-imaging lens unit 303 is a lens unit configured to reform an object image on the expected image plane formed by the image capturing optical system, onto the focus detection element 304, and includes two (a pair of) re-imaging lenses 303A and 303B. The light flux that has passed the diaphragm aperture 302A and the re-imaging lens 303A forms the object image on the focus detection element 304, and the light flux that has passed the diaphragm aperture 302B and the re-imaging lens 303B forms the object image on the focus detection element 304.

The focus detection element 304 includes a photoelectric conversion element, such as a CCD sensor and a CMOS sensor, which includes a plurality of two-dimensionally photoelectric converters (referred to as "pixels" hereinafter) on the XY plane. The camera CPU 201 can read, as a phase difference image signal, the electric charges from the pixels in a designated read area on the focus detection element 304.

Figure 4:
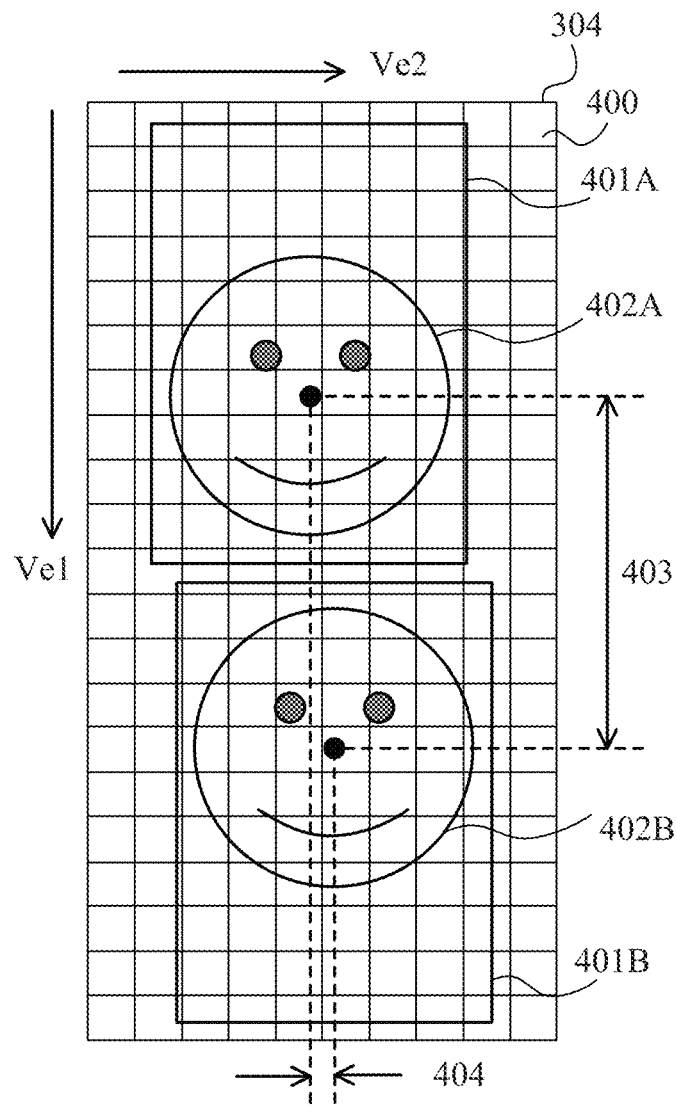
FIG. 4 is a positional relationship between an optical image and pixels on the focus detection element in an in-focus state according to the first embodiment.

FIG. 4 illustrates a positional relationship between the object image and the pixels on the focus detection element 304 in the in-focus state of the image capturing optical system. The re-imaging lens 303A forms the object image 402A on the plurality of two-dimensionally arranged pixels 400, and the re-imaging lens 303B forms the object image 402B on the plurality of two-dimensionally arranged pixels 400. The X direction in which the pair of object images 402A and 402B are divided and formed is a correlation direction in which the pair of object images displace with a correlation with the focus state of the image capturing optical system, and will be referred to as a Ve1 direction (first direction). A direction (Y direction) orthogonal to the Ve1 direction will be referred to as a Ve2 direction (second direction) hereinafter. Reference numerals 401A and 401B represent image outlines of the object images 402A and 402B. The image outline depends on the shape of the rectangular aperture 300A in the aperture mask 300.

Figure 5:
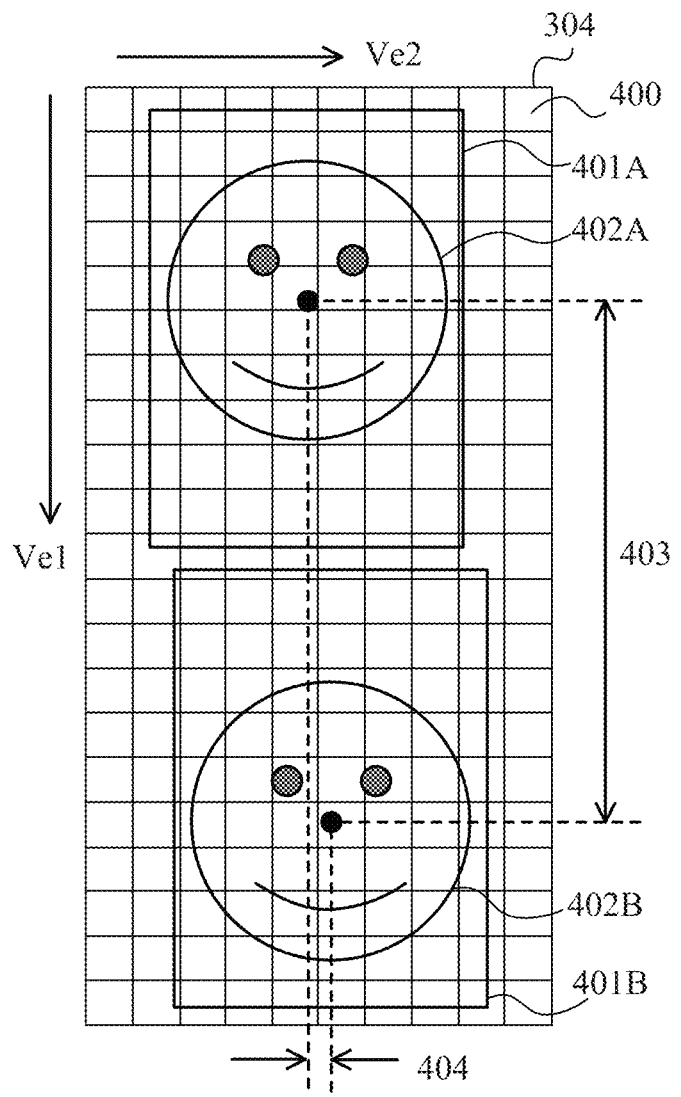
FIG. 5 is a positional relationship between the optical image and the pixels on the focus detection element in a defocus state according to the first embodiment.

FIG. 5 illustrates a positional relationship between the object image and the pixels on the focus detection element 304 in the defocus state of the image capturing optical system. Reference numeral 403 denotes a distance (first distance) between the object images 402A and 402B in the Ve1 direction. As the focus state of the image capturing optical system changes, the distance 403 changes in the Ve1 direction.

In FIGS. 4 and 5, reference numeral 404 denotes a distance (second distance) between the object images 402A and 402B in the Ve2 direction. The distance 404 is caused by a relative positional difference and angular difference between the re-imaging lens unit 303 and the focus detection element 304 due to the aberration and the assembly error of the image capturing optical system and the image capturing optical system 304, and does not change even when the focus state of the image capturing optical system changes.

Figure 6:
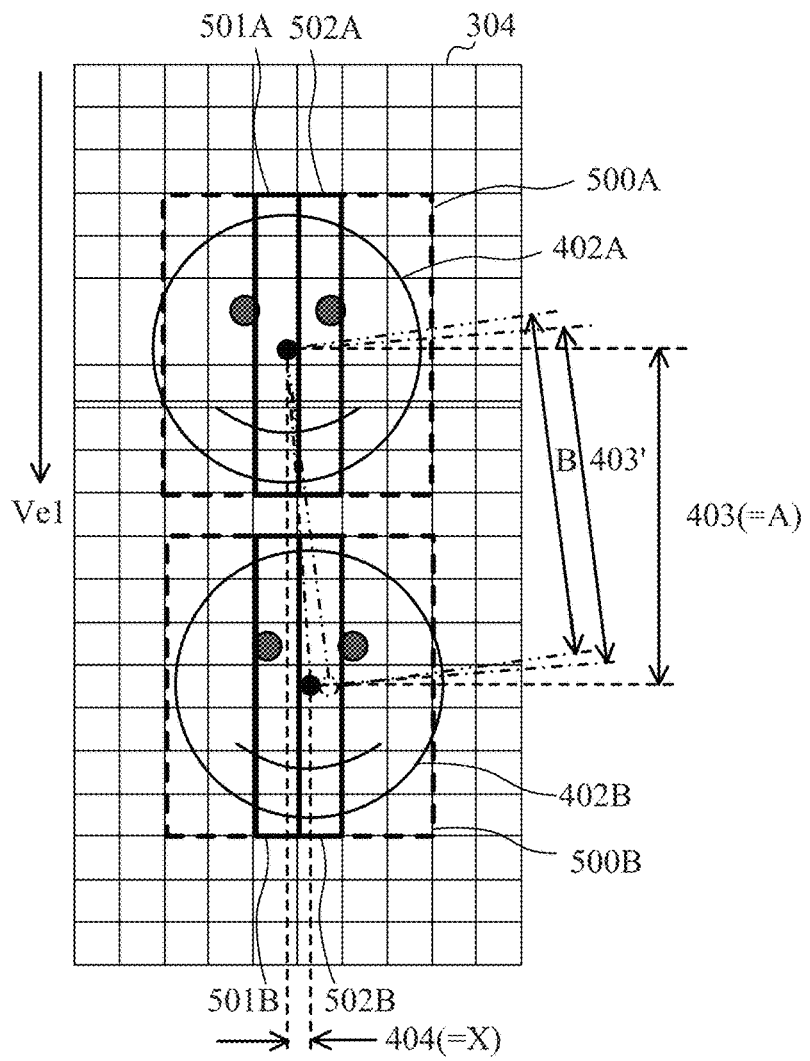
FIG. 6 illustrates a read area on the focus detection element according to the first embodiment.

FIG. 6 illustrates read areas 500A and 500B by broken line frames, which correspond to the object images 402A and 402B on the focus detection element 304. The pixels in the read area 500A photoelectrically converts one object image 402A, and the pixels in the read area 500B photoelectrically converts the other object image 402B. The read area 500A includes a plurality of detection areas 501A and 502A, each of which includes one pixel column (or two or more pixels), and the read area 500B includes a plurality of detection areas 501B and 502B, each of which includes one pixel column (or two or more pixels). The camera CPU 210 generates a phase difference image signal by reading the electric charges stored in the pixel column in the Ve1 direction. The camera CPU 210 sets the two phase difference image signals generated from the electric charges read out of the pair of corresponding detection areas in the read areas 500A and 500B, to the pair of phase difference image signals, and calculates a phase difference as a relative shift amount between them.

The phase difference corresponds the distance 403, and the camera CPU 210 calculates a defocus amount as a focus state in the image capturing optical system by using the phase difference. A first calculation process is defined as a process for calculating the distance 403 based on the phase difference image signal generated by reading the electric charge in the Ve1 direction.

Herein, when the distance 404 in the Ve2 direction is 0, the distance 403 can be precisely calculated by using the pair of phase difference image signals generated based on the electric charges read from the detection areas 501A and 501B or 502A and 502B, etc. at the same position (in the same column) in the Ve2 direction. However, the distance 404 does not become actually 0 for the above reasons. Hence, as illustrated in FIG. 6, a pair of phase difference image signals generated by reading electric charges from the detection areas at the same columns are obtained by photoelectrically converting different areas in the object images 402A and 402B. The distance 403 in the Ve1 direction and finally the defocus amount cannot precisely be calculated based on the pair of phase difference image signals generated by reading the electric charges out of the detection areas in the same column. In order to precisely calculate the defocus amount, it is necessary to consider the distance 404 in the Ve2 direction.

Thus, this embodiment previously obtains or calculates in the factory of the image capturing apparatus the distance 404 generated by the aberration and the assembly error, stores it in the EEPROM 211, and uses it for a correction value (first correction value) used to calculate a distance 403' after the distance 404 is corrected as described later. The correction value may be the distance 404 itself, a modified value of the distance 404, or a value corresponding to the distance 404.

This embodiment sets the correction value to C bits representing the size of the distance 404. In FIG. 6, since the object image 402B shifts to the right side of the object image 402A, it is necessary to consider the two phase difference image signals generated by reading the electric charges out of the detection areas 501A and 501B and the phase difference image signal generated by reading the electric charge out of the detection area 502B.

Accordingly, the camera CPU 210 generates a first phase difference image signal, a second phase difference image signal, and a third phase difference image signal based on the electric charges read in the Ve1 direction out of each of the detection areas 501A, 501B, and 502B as the first detection area, the second detection area, and the third detection area. Next, the camera CPU 210 calculates the two distances based on the first calculation process by using the first to third phase difference image signals. More specifically, the camera CPU 210 calculates the distance A (403 or the first distance) between the detection areas 501A and 501B based on the first and second phase difference image signals, and the distance B (first distance) between the detection areas 501A and 502B based on the second and third phase difference image signals. The camera CPU 210 calculates the post-correction distance 403' (referred to as a "corrected distance" hereinafter) by using the distances A and B and the correction value C.

Figure 7:
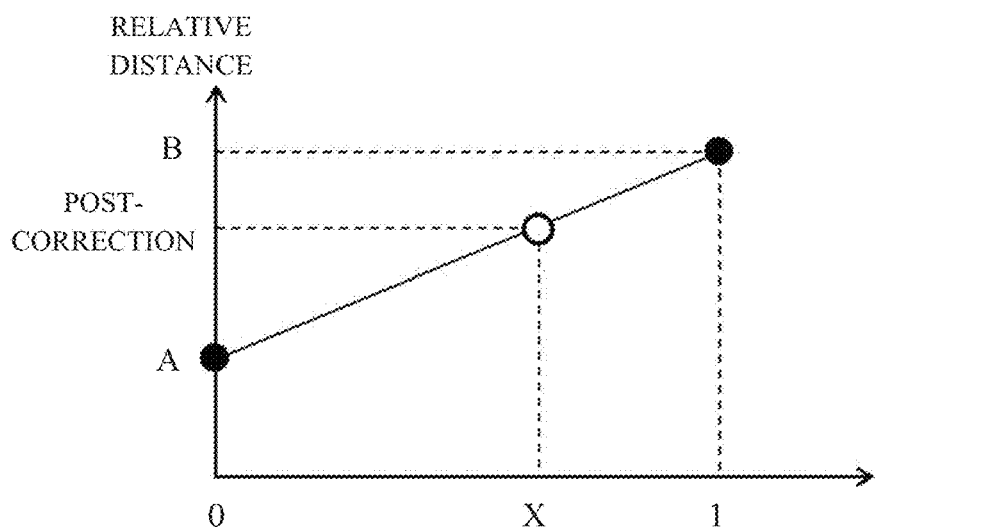
FIG. 7 illustrates a relationship between distances A and B and a correction distance according to the first embodiment.

FIG. 7 illustrates a relationship between the distances A and B and the corrected distance 403'. This embodiment assumes the object in which the distance increases, as illustrated in FIG. 6, when the detection area of the read area 500B on the side of the object image 402B is shifted to the right side. Since the distance 404 has C bits, the corrected distance 403' can be calculated by the interpolation calculation using A and B. The corrected distance 403' is calculated by the interpolation calculation with the following expression (1).

$$\text{Corrected distance } 403' = A + C(B-A) \qquad (1)$$

The camera CPU 210 calculates the defocus amount by using the corrected distance 403 as the true phase difference between the pair of phase difference image signals. The defocus amount is calculated by multiplying the phase difference by a coefficient representing a ratio between the defocus amount and the phase difference.

This embodiment can restrain the phase difference calculated in the correlation direction from being incorrect and the focus detection precision from decreasing when the pair of object images relatively shift from each other in a direction orthogonal to the correlation direction due to the aberration and the assembly error. This configuration can provide a precise focus detection or phase difference AF.

Second Embodiment

A description will now be given of an image capturing apparatus and a focus detection apparatus according to a second embodiment of the present invention. The image capturing apparatus and the focus detection apparatus according to this embodiment have configurations similar to those of the first embodiment, and those elements, which are corresponding elements in the first embodiment, will be designated by the same reference numerals as those in the first embodiment.

The first embodiment sets to the detection value (fixed value) in the factory, the correction value used to restrain the focus detection precision from decreasing due to the aberration and the assembly error. However, the distance 404 in FIG. 6 fluctuates due to the image capturing environment, such as the temperature and humidity when in the image capturing. This embodiment detects the distance 404 that depends on the image capturing environment, in capturing the image, and uses it for the correction value.

Figure 8:
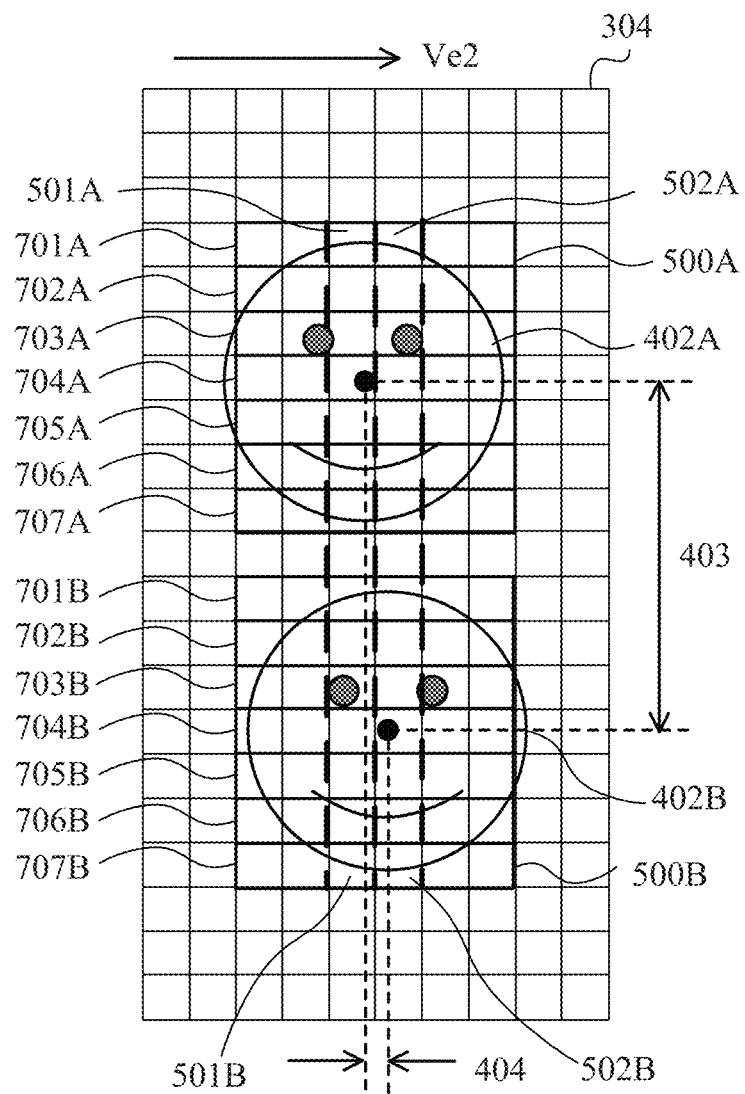
FIG. 8 illustrates a read area on the focus detection element according to a second embodiment.

FIG. 8 illustrates the read areas 500A and 500B corresponding to the object images 402A and 402B on the focus detection element 304 according to this embodiment. Similar to the first embodiment, the pixels in the read area 500A photoelectrically convert the object image 402A, and the pixels in the read area 500B photoelectrically convert the object image 402B. According to this embodiment, the read area 500A includes a plurality of detection reads 701A and 707A, each of which includes one pixel column (two or more pixels), and the read area 500B includes a plurality of detection reads 701B to 707B, each of which includes one pixel column (two or more pixels). The camera CPU 210 reads the electric charges stored in the pixel column in each detection area in the Ve2 direction (second direction), and generates a distance calculating image signal (referred to as a "Ve2 signal" hereinafter). The camera CPU 210 calculates the distance 404 corresponding to the shift amount of the pair of Ve2 signals generated based on the electric charges read out of the pair of detection areas between the read areas 700A and 700B. This embodiment calculates the distance 404 under the actual image capturing environment, and uses the distance 404 for the correction value to calculate the phase difference.

Figure 9:
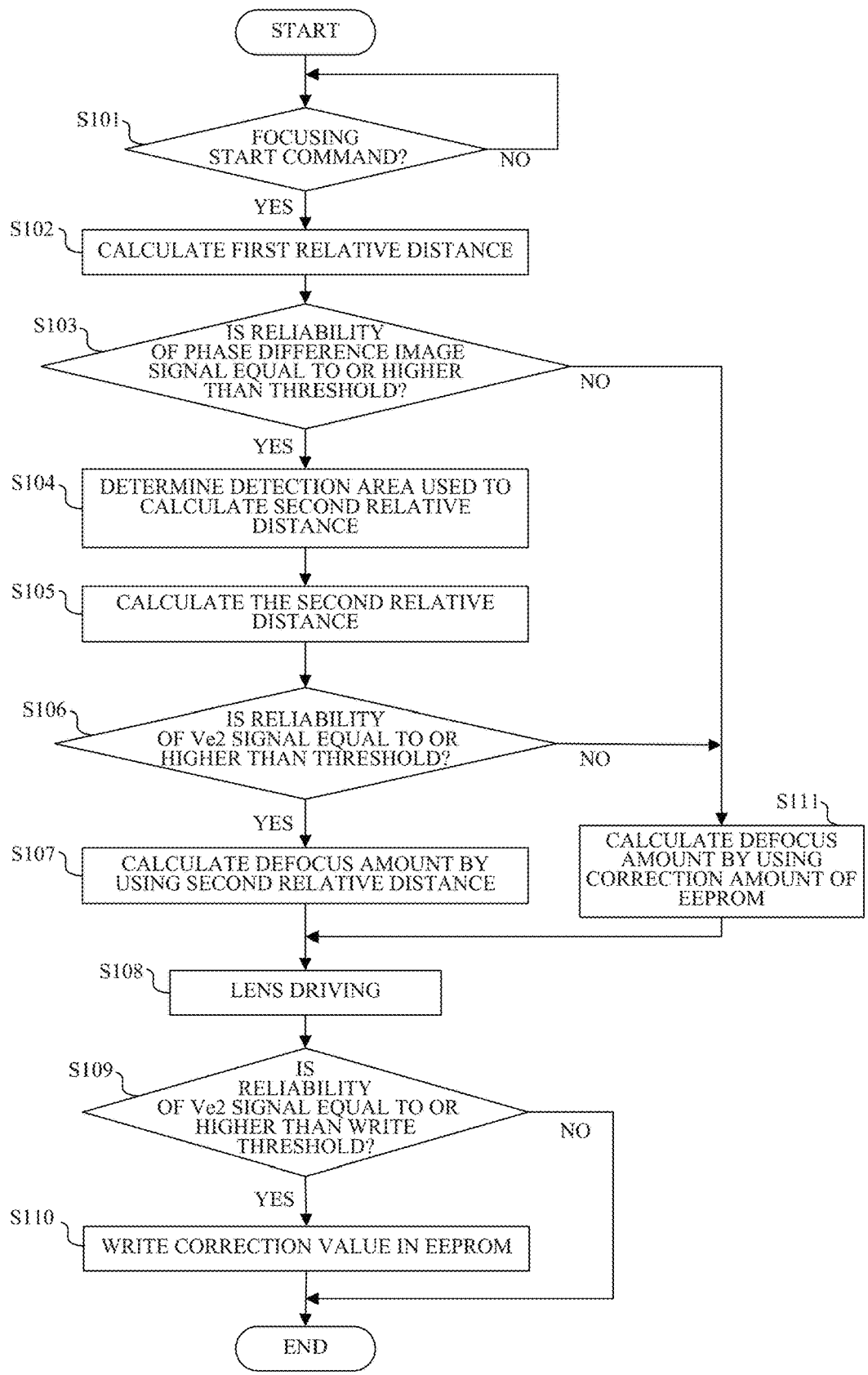
FIG. 9 is a flowchart of an AF process according to the second embodiment.

A flowchart in FIG. 9 illustrates the phase difference AF process in the in-focus state of the image capturing optical system according to this embodiment. The camera CPU 210 as a computer executes this process in accordance with the focus detection program as a computer program.

In the step S101, the camera CPU 210 determines whether there is a focusing start command by the user via the operation detector 213. When there is the focusing start command, the camera CPU 210 moves to the step S102.

In the step S102, the camera CPU 210 reads the electric charges in the Ve1 direction out of the detection areas 501A, 501B, 502A, 502B, etc. illustrated by the broken line frame in FIG. 8, and calculates the distances A and B through the first calculation process described in the first embodiment.

Next, in the step S103, the camera CPU 210 determines the reliability of the phase difference image signal or the reliability the distance 403 based on the waveform of the phase difference image signal generated in the step S102. The camera CPU 210 determines whether the distance (second distance) 404 is to be calculated based on the result of the reliability determination.

In order to calculate the distance 104 under the actual environment, it is necessary to read the contrasts on the same areas in the object images 402A and 402B in the Ve2 direction. However, the positions of the object images 402A and 402B in the Ve1 direction are different according to the focus state in the image capturing optical system. Thus, the camera CPU 210 uses the contrasts obtained from the waveforms of the pair of phase difference image signals generated in the step S102, and determines whether the pair of phase difference image signals are the signals obtained by photoelectrically converting the same areas in the object images 402A and 402B. When the pair of phase difference image signals are highly reliable signals which are obtained by photoelectrically converting the same areas in the object images 402A and 402B, the distance 403 calculated based on the pair of phase difference image signals are highly reliable. When the reliability is equal to or higher than a predetermined threshold, the contrast is high. Thus, the pixels in the detection areas corresponding to the same areas in the object images 402A and 402B can be precisely identified and the camera CPU 210 can calculate the highly reliable distance 403. When the distance 403 is highly reliable, the camera CPU 210 can precisely determine the pair of detection areas used to calculate the distance 404 in the step S104, which will be described later. The camera CPU 210 moves to the step S104 when the reliability is equal to or higher than the threshold.

On the other hand, when the reliability of the phase difference image signal is lower than the threshold, the camera CPU 210 determines that the distance 404 is undetectable and moves to the step S111.

In the step S104, the camera CPU 210 determines the pair of detection areas used to calculate the distance 403. While it is necessary to read the contrasts in the same areas in the object images 402A and 402B in the Ve2 direction so as to calculate the distance 404 under the actual image capturing environment, as described above, the positions of the object images 402A and 402B are different according to the focus state of the image capturing optical system. Thus, the camera CPU 210 determines the same areas in the object images 402A and 402B by using the highly reliable distance 403 detected in the step S102, and selects the detection areas corresponding to the same areas as the pair of detection areas used to calculate the distance 404. Thereafter, the camera CPU 210 moves to the step S105.

In the step S105, the camera CPU 210 calculates the distance 404 as the correction value (second correction value). More specifically, the camera CPU 211 reads the electric charges in the Ve2 direction, based on the pair of detection areas obtained by photoelectrically converting the same areas in the object images 402A and 402B, such as the detection areas 701A and 701B and the detection areas 702A and 702B, and generates the pair of Ve2 signals. The camera CPU 210 calculates the distance 404 by using the pair of Ve2 signals. A second calculation process is defined as a process used to calculate the distance 404 based on the pair of Ve2 signal generated by reading the electric charges in the Ve2 direction.

The number of pairs of Ve2 signals generated by reading the electric charges in the Ve2 direction in calculating the distance 404 may accord with the number of pixels from which the electric charges are read in the Ve1 direction in calculating the distance 403. Since there are seven pixels from which the electric charges are read in the Ve1 direction in this embodiment, seven pairs of Ve2 signals are used to calculate the distance 404 so as to improve the calculation precision of the distance 404. When the step S105 ends, the camera CPU 210 moves to the step S106.

In the step S106, the camera CPU 210 determines the reliability of the Ve2 signal generated in the step S105 or the reliability of the distance 404, and determines whether the defocus amount is to be calculated based on the reliability determination result and the distance 404. The camera CPU 210 calculates the reliability of the Ve2 signal based on the contrast obtained from the waveform of the Ve2 signal generated in the step S105.

When the contrast is high and the reliability of the Ve2 signal is equal to or higher than the predetermined threshold, the distance 404 is highly reliable as the correction value calculated in the step S105. Thus, the camera CPU 210 moves to the step S107 and calculates the corrected distance 403' by using the distances 403 and 404, and calculates the corrected distance 403' as the defocus amount by using the phase difference. More specifically, the camera CPU 210 calculates the corrected distance (phase difference) 403' by using the following expression (2). A and B represent the distances A and B calculated in the step S102.

$$\text{Corrected distance } 403' = A \text{ distance } 404 \, (B-A) \quad (2)$$

The defocus amount is calculated by multiplying the phase difference by the coefficient representing the ratio between the defocus amount and the phase difference.

On the other hand, when the reliability of the Ve2 signal is lower than the threshold, the distance 404 is less reliable as the correction value. Thus, the camera CPU 210 moves to the step S111, and calculates the corrected distance 403' by using the distance 403 and the correction value C stored in the EEPROM 211 described in the first embodiment, and calculates the defocus amount by using the corrected distance 403' as the phase difference. More specifically, the camera CPU 210 calculates the corrected distance (phase difference) 403' by using the expression (1) described in the first embodiment. The camera CPU 210 calculates the defocus amount by multiplying the phase difference by the above coefficient. The camera CPU 210 that has calculated the defocus amount in the steps S107 and S111 moves to the step S108.

In the step S108, the camera CPU 210 sends to the lens CPU 103 the focus driving command that includes the calculated defocus amount, and instructs the lens CPU 103 to drive the focus lens 101 by a driving amount corresponding to the defocus amount. This configuration provides the image capturing optical system with the in-focus state.

Next, in the step S109, the camera CPU 210 determines whether the reliability of the distance 404 calculated in the step S105 is equal to or higher than a predetermined write threshold. An optimal correction value depends on the image capturing environment. When the distance 404 is highly reliable, the camera CPU 210 moves to the step S110, rewrites the correction value (first correction value) C written in the EEPROM 211 with the distance (second correction value) 404, and optimizes the correction value C so that it is suitable for the latest image capturing environment. The write threshold is set to a value higher than the threshold used to determine the reliability of the distance 404 in the step S106 so as to prevent the correction value C from being easily rewritten.

When the correction value obtained under the image capturing environment is stored in the EEPROM 211, the correction value optimal to the image capturing environment stored in the EEPROM 211 can be used even when the distance 403 is less reliable in the step S103 in the next and subsequent phase difference AF. As described in the first embodiment, the correction value written in the EEPROM 211 may be the distance 404 itself, the properly modified value of the distance 404, or a value corresponding to the distance 404. The camera CPU 210 then ends the phase difference AF.

This embodiment calculates the defocus amount by using the distance 404 calculated under the image capturing environment for the correction value. However, the distance 404 calculated under the image capturing environment in the initial image capturing may be stored in the EEPROM 211 and a sum of the distance 404 and the adjusted value calculated for each of the second and subsequent, image capturing can be used for the correction value. This is true of the following third embodiment.

This embodiment can restrain the phase difference calculated in the correlation direction from being incorrect and the focus detection precision from being decreasing when the pair of object images relatively shift from each other in a direction orthogonal to the correlation direction due to the aberration and the assembly error. This configuration can provide a precise focus detection phase difference AF.

Third Embodiment

A description will now be given of an image capturing apparatus and a focus detection apparatus according to a third embodiment of the present invention. This embodiment is a variation of the second embodiment. The image capturing apparatus and focus detection apparatus according to this embodiment have the same configurations as those of the first embodiment, and those elements, which are corresponding elements in the first embodiment, will be designated by the same reference numerals in the first embodiment.

While the second embodiment does not drive the focus lens 101 before the distance 404 is calculated, the object images 402A and 402B may be located outside the image outlines 401A and 401B when the defocus amount is large. Hence, this embodiment drives the focus lens 101 until an approximate in-focus state is obtained, and then calculates the distance 404.

Figure 10:
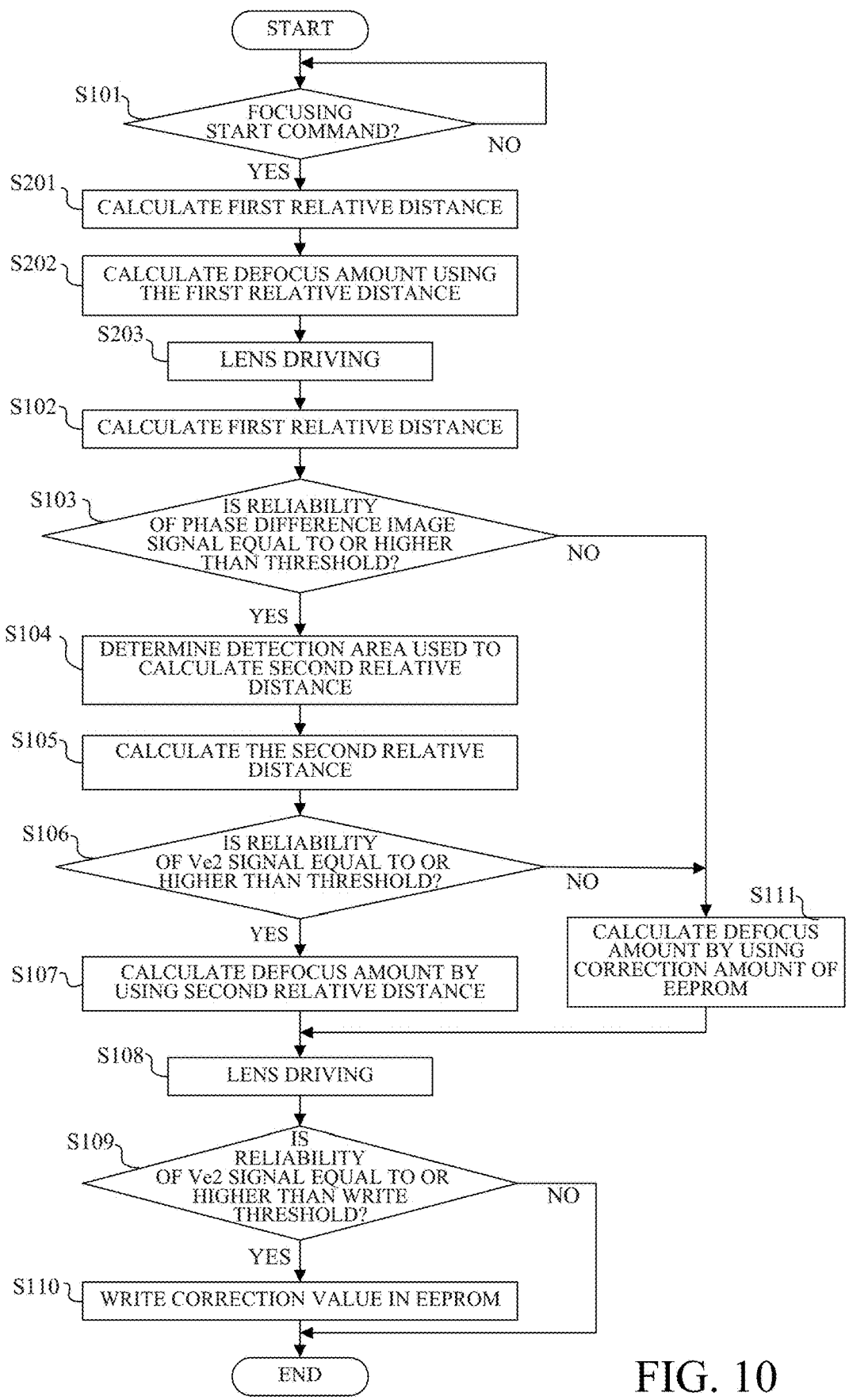
FIG. 10 is a flowchart of an AF Process according to the second embodiment.

A flowchart in FIG. 10 illustrates a phase difference AF process in the in-focus state of the image capturing optical system according to this embodiment. Those steps in FIG. 10, which are corresponding steps in FIG. 9 in the second embodiment, will be designated by the same step numerals.

The camera CPU 210 that has confirmed a focusing start command by the user in the step S101 moves to the step S201.

In the step S201, the camera CPU 210 generates, similar to the following step S102, a pair of phase difference image signals by reading the electric charges in the Ve1 out of the pair of detection areas 501A and 501B, 502A and 502B, etc. illustrated by the broken line frame in FIG. 8. The camera CPU 210 calculates the distance (first distance) 403 corresponding to the phases of the pair of phase difference image signals. In this case, there may be at least two detection areas.

In the S202, the camera CPU 210 calculates the defocus amount by multiplying the phase difference as the distance 403 calculated in the step S202 by the coefficient representing the ratio between the defocus amount and the phase difference.

Next, in the step S203, the camera CPU 210 sends the focus driving command that includes the calculated defocus amount to the lens CPU 103, and instructs the lens CPU 103 to drive the focus lens 101 by a driving amount corresponding to the defocus amount. This configuration can provide the image capturing optical system with the approximate in-focus state.

Next, the camera CPU 210 performs to the process from the step S102 to S110.

This embodiment can restrain the phase difference calculated in the correlation direction from being incorrect and the focus detection precision from decreasing when the pair of object images relatively shift from each other in a direction orthogonal to the correlation direction due to the aberration and the assembly error. This configuration can provide a precise focus detection or phase difference AF.

While each embodiment detects a focus state by using the phase difference detection method and the focus detection element 304 provided separately from the image sensor 209, the focus state by the phase difference detection method may be detected by using the image sensor 209 as the focus detection element, in which a plurality of pixels are two-dimensionally arranged.

Each embodiment can restrain the focus detection precision from decreasing when the pair of object images relatively shift in the second direction orthogonal to the first direction (correlation direction) due to the aberration, the assembly error, and the image capturing environment, and provides a highly precise focus detection.

Fourth Embodiment

Referring now to the accompanying drawings, a description will be given of a fourth embodiment of the present invention.

Figure 11:
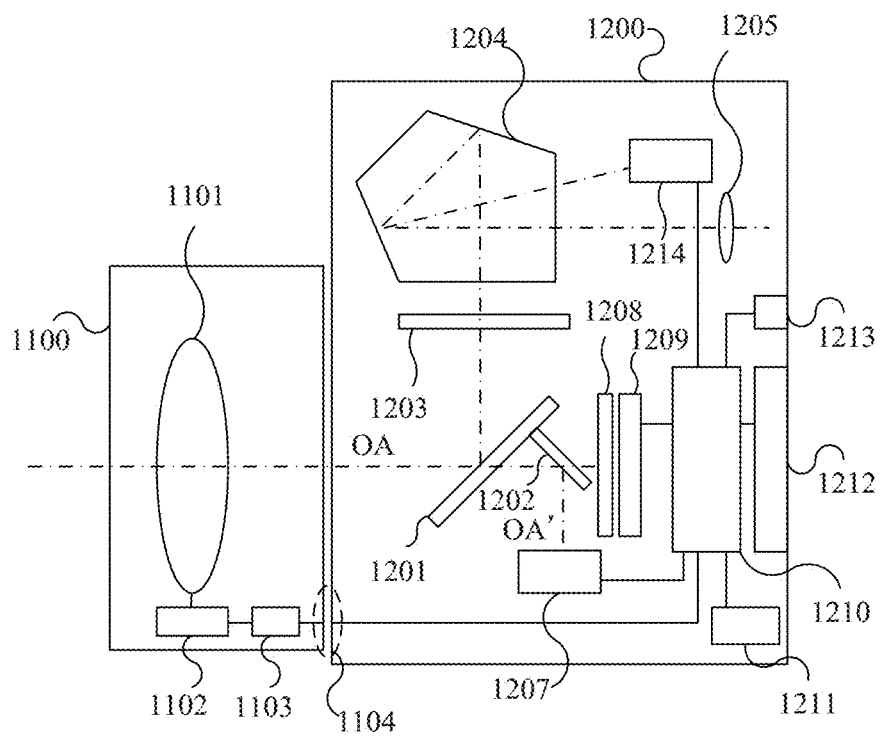
FIG. 11 is a block diagram of a configuration of an image capturing apparatus according to a fourth embodiment according to the present invention.

FIG. 11 illustrates a configuration of an image capturing apparatus 1200 that includes a focus detection apparatus according to the fourth embodiment of the present invention. An image capturing lens (interchangeable lens) 1100 is detachably attached to the image capturing apparatus 1200 via a lens attachment mechanism in an unillustrated mount part. The mount part includes an electric contact unit 1104. The image capturing lens 1100 includes an image capturing optical system that includes a focus lens 1100, an unillustrated magnification varying lens, an aperture stop, etc.

The light flux from the unillustrated object is guided to the main mirror 1201 in the image capturing apparatus 1200 through the image capturing optical system. The main mirror 1201 is obliquely disposed relative to the optical axis in an image capturing optical path and is movable between a first position used to guide the light flux from the object to a viewfinder optical system located above and a second position outside the image capturing optical path.

The main mirror 1201 includes a half-mirror part at its center part, and when the main mirror 1201 is located at the first position, the part of the light flux from the object transmits the half-mirror part. The transmitting light flux is reflected on a sub mirror 1202 behind the main mirror 1201 and guided to a focus detection optical unit 1207. A detailed configuration of the focus detection optical unit 1207 will be described later. The light flux reflected on the main mirror 1201 is imaged on a focus plate 1203 disposed at position optically conjugate with an image sensor 1209. A light flux (object image) that has been diffused by and transmitted through the focus plate 1203 is converted into an erect image by a penta-dach prism 1204. The erect image is enlarged by an eyepiece 1205 and observed by a user. Part of the diffused light is introduced to the photometric unit 1214. A luminance of the object and a type of the illumination light for illuminating the object can be detected by using a photometric signal from the photometric signal 1214.

When the main mirror 1201 retreats to the second position, the sub mirror 1202 is folded on the main mirror 1201 and retreats to the outside of the image capturing optical path. A light flux from the image capturing lens 1100 passes a focal plane shutter 1208 as a mechanical shutter and reaches the image sensor 1209. The focal plane shutter 1208 restricts a light amount incident on the image sensor 1209. The image sensor 1209 includes a photoelectric conversion element, such as a CCD and a CMOS, configured to photoelectrically convert the object image formed by the image capturing lens 1100 and to output an electric signal.

The camera CPU 1210 serves as a controller configured to control a variety of operations of the image capturing apparatus 1200 and the image capturing lens 1100. The camera CPU 1210 communicates with the lens CPU 1103 in the image capturing lens 1100 via the electric contact unit 1104.

The camera CPU 1210 calculates a phase difference between the pair of phase difference image signals through a correlation operation to the pair of phase difference image signals generated with the output signal from the focus detection optical unit 1207, and calculates (obtains) a defocus amount representing a focus state of the image capturing optical system by using the phase difference. The camera CPU 1210 sends the focus driving command containing the defocus amount to the lens CPU 1103. The lens CPU 1103 drives the focus lens 1101 in a direction of the optical axis OA in the image capturing optical system by controlling the lens driving mechanism 1102 according to the focus driving command. The lens driving mechanism 1102 includes a stepping motor as a driving source. This configuration provides a phase difference autofocus (AF) that detects a focus state by the phase difference detection method and drives the focus lens. The camera CPU 1210 serves as a focus detection apparatus that includes a signal generator and a calculator, in addition to a focus control apparatus that includes a controller.

The camera CPU 1210 is connected to an EEPROM (storage unit) 1211 configured to store a parameter necessary to control the image capturing apparatus 1200, camera identification information used to identify an individual image capturing apparatus 1200, the following correction coefficient, etc.

The camera CPU 1210 generates image data through a variety of processes to an output signal (image capturing signal) from the image sensor 1209. The display apparatus 1212 includes a liquid crystal device, etc., and displays image data generated by the camera CPU 210 and user set information.

The camera CPU 1210 is connected to an operation detector 1213 configured to detect a user operation. The operation detector 1213 detects the user operation to an operation unit, such as an unillustrated release button and AF start button.

Figure 12:
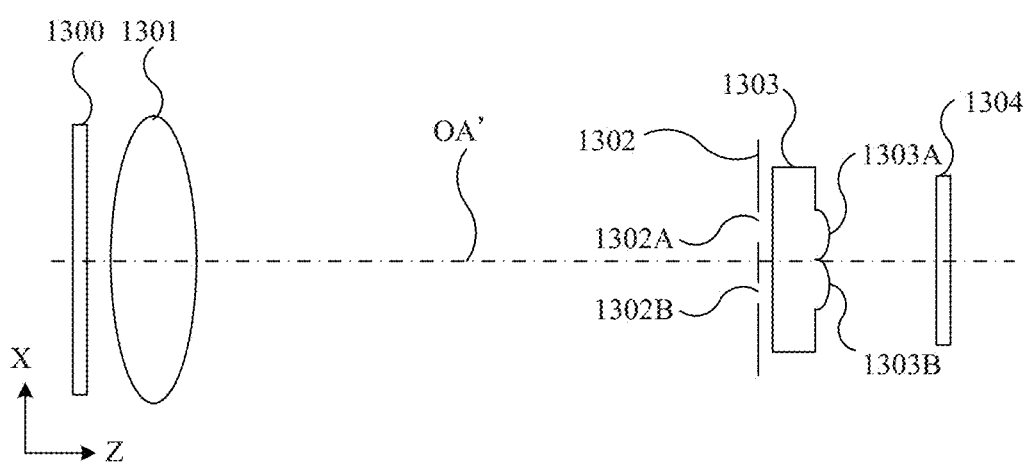
FIG. 12 is a sectional view of a configuration of a focus detection optical unit according to the fourth embodiment.
Figure 13:
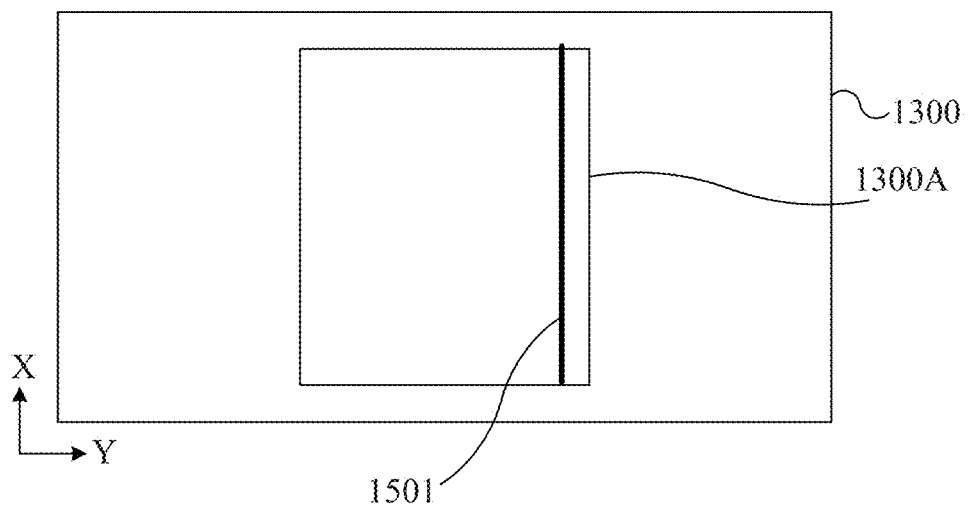
FIG. 13 is an KY plane view of an aperture mask 300 in the focus detection optical unit according to the fourth embodiment.

FIG. 12 illustrates a YZ section of the focus detection optical unit 1207. FIG. 13 illustrates an XY plane of an aperture mask 1300. A Z-axis extends in the same direction as the optical axis OA' in the focus detection optical unit 1207. An X-axis extends in a longitudinal direction of an aperture 1300A in the aperture mask 1300. A Y-axis extends in a direction orthogonal to the longitudinal direction.

The focus detection optical unit 1207 includes, in order along the optical axis OA', the aperture mask 1300, a field lens 1301, a multi-aperture stop 1302, a re-imaging lens unit 1303, and a focus detection element 1304. A focus detection optical system includes the aperture mask 1300, the field lens 1301, the multi-aperture stop 1302, and the re-imaging lens unit 1303.

The aperture mask 1300 includes, at its center as illustrated in FIG. 13, the rectangular aperture 1300A configured to limit a light flux that has passed the image capturing optical system. Reference numeral 1501 in FIG. 13 represents an object image used for the following description. The aperture mask 1300 is disposed on or near an expected image plane of the image capturing optical system. The multi-aperture stop 1302 includes a thin plate, and two or a pair of diaphragm apertures 1302A and 1302B. The field lens 1301 images an aperture shape in the multi-aperture stop 1302 on or near the pupil plane in the image capturing optical system. This configuration divides a light flux that has passed the image capturing optical system.

A re-imaging lens unit 1303 is a lens unit configured to reform an object image on the expected image plane formed by the image capturing optical system, onto the focus detection element 1304, and includes two (a pair of) re-imaging lenses 1303A and 1303B. The light flux that has passed the aperture 1302A and the re-imaging lens 1303A forms the object image on the focus detection element 1304, and the light flux that has passed the aperture 1302B and the re-imaging lens 1303B forms the object image on the focus detection element 1304.

The focus detection element 1304 includes a photoelectric element, such as a CCD sensor and a CMOS sensor, which includes a plurality of two-dimensionally photoelectric converters (referred to as "pixels" hereinafter) on the XY plane. The camera CPU 1201 can read, as a phase difference image signal, the electric charges from the pixels in a designated read area on the focus detection element 1304.

Figure 14:
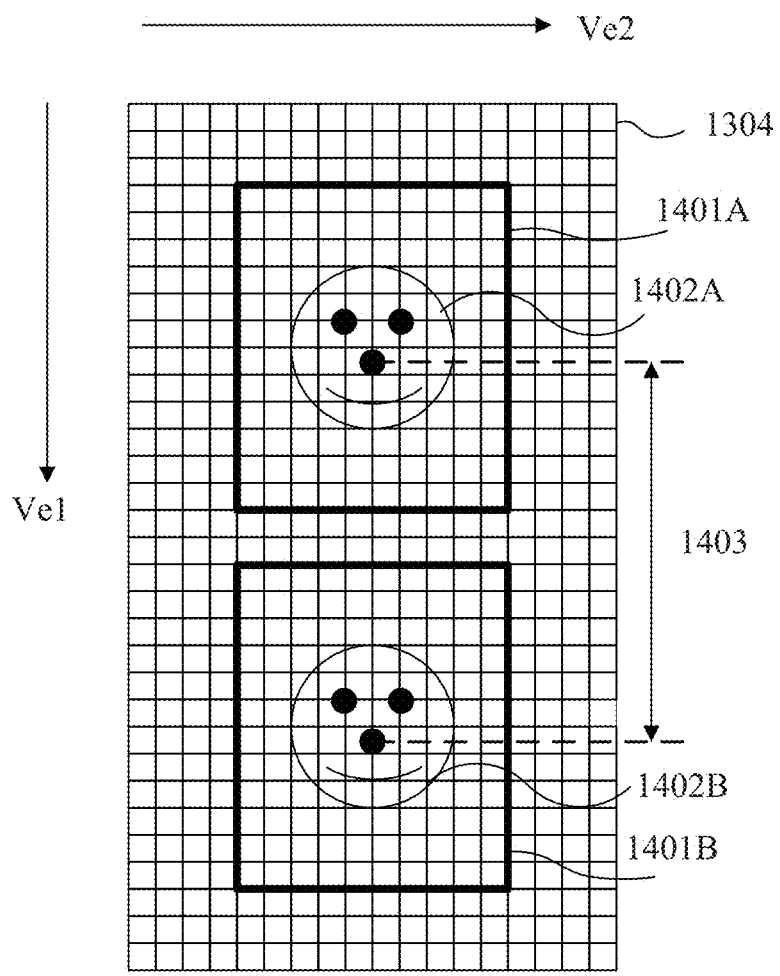
FIG. 14 illustrates A and B images on the focus detection element according to the fourth embodiment.

FIG. 14 illustrates a positional relationship between the object image and the pixels on the focus detection element 1304 in the in-focus state of the image capturing optical system. The re-imaging lens 1303A forms the object image 1402A on the plurality of two-dimensionally arranged pixels 1400, and the re-imaging lens 1303B forms the object image 1402B on the plurality of two-dimensionally arranged pixels 1400. The X direction in which the pair of object images 1402A and 1402B are divided and formed is a correlation direction in which the pair of object images displace with a correlation with the focus state of the image capturing optical system, and will be referred to as a Ve1 direction (first direction). A direction (Y direction) orthogonal to the Ve1 direction will be referred to as a Ve2 direction (second direction) hereinafter. Reference numerals 1401A and 1401B represent image outlines of the object images 1402A and 1402B. The image outline depends on the shape of the aperture 1300A in the aperture mask 1300.

Reference numeral 1403 denotes a distance between the object images 1402A and 1402B in the Ve1 direction. As the focus state of the image capturing optical system changes, the distance 1403 changes in the Ve1 direction. The distance between the 1401A and 1401B equal to the distance 1403, and ideally the object images 1402A and 1402B in the image outlines 1401A and 1401B perfectly overlap each other in the in-focus state. When the object image 1401A is an A image and the object image 1401B is a B image, a defocus amount can be calculated based on the phase difference in the Ve1 direction of the vector of these two images.

Figure 15:
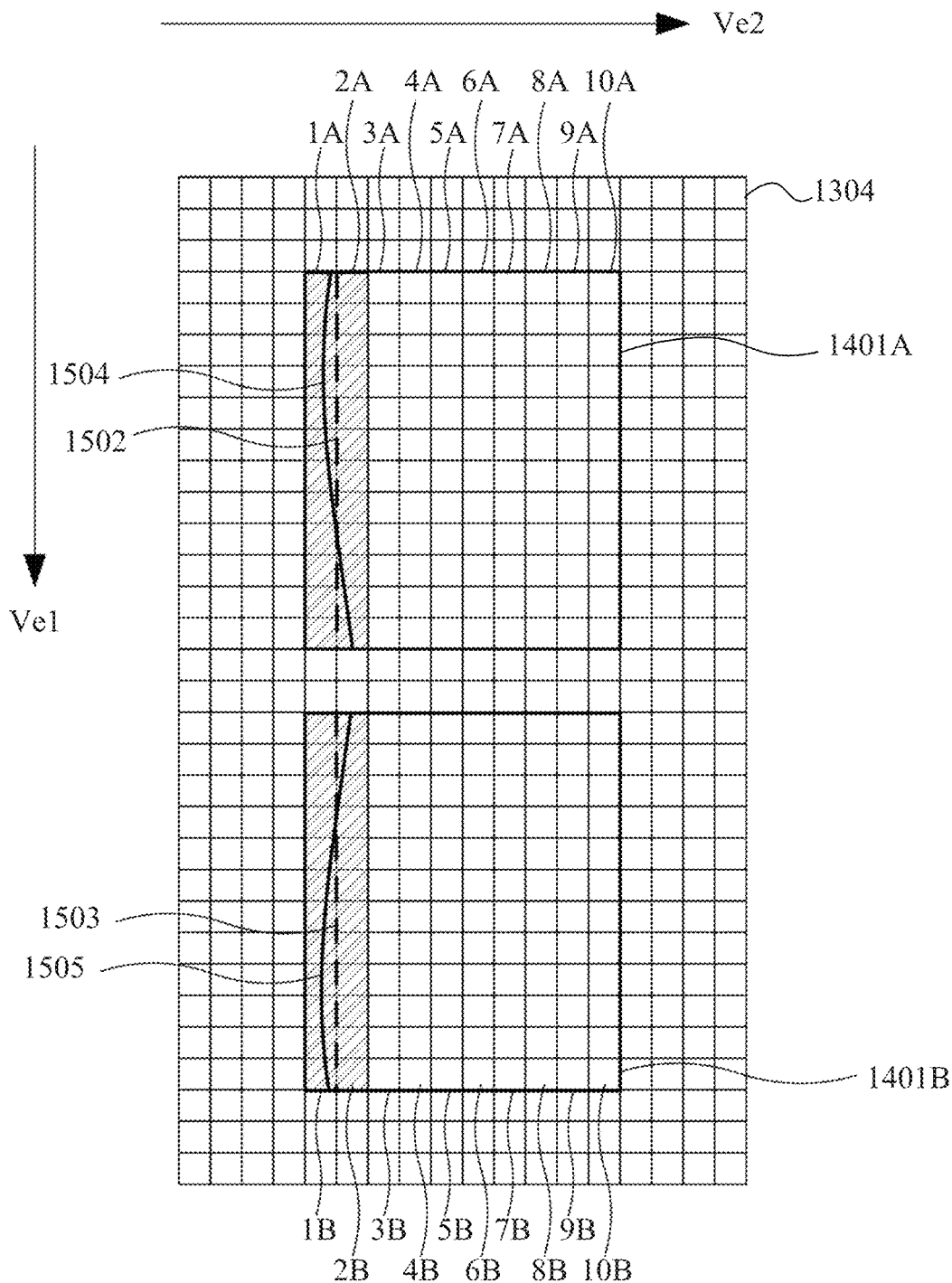
FIG. 15 illustrates an optical distortion.

However, actually due to the optical aberrations in the re-imaging lenses 1303A and 1303B, the A image and the B image displace in the Ve2 direction orthogonal to the Ve1 direction even in the in-focus state. Referring to FIGS. 13 and 15, description will be given of the distortion of the optical image (referred to as an "optical distortion" hereinafter) caused by the optical aberration.

The object 1501 illustrated in FIG. 13 is an object image near the right end of the aperture mask 1300, which is a line extending in the Ve2 direction. FIG. 15 illustrates an imaging position of the object image 1501 on the focus detection element 1304 by the re-imaging lenses 1303A and 1303B. The image outline in the A image (referred to as an "A image frame" hereinafter) 1401A contains pixel lines 1A to 10A, each of which extends in the Ve1 direction. The image outline in the B image (referred to as a "B image frame" hereinafter)) 1401B contains pixel lines 1B to 10B, each of which extends in the Ve1 direction. When there is no optical distortion, the A image (broken line) 1502 is imaged as a line between the pixel lines 1A and 2A, and the B image (broken line) 1503 is imaged as a line between the pixel lines 1B and 2B.

When there is an optical distortion, the A image (solid line) 1504 and the B image (solid line) 1505 become curves rather than the lines, and the optical distortion causes the A image 1504 and the B image 1505 to provide a shape shift distorted on the opposite sides in the Ve2 direction. Thereby, the pair of phase difference image signals corresponding to the A image 1504 and the B image 1505 have a shape difference, and do not overlap each other. Thus, the correlation calculation result of the phase difference has an error. The defocus amount calculated based on the phase difference has an error. It is necessary to correct the shape difference between the pair of phase difference image signals because the A image 1504 and B image 1505 cause a shape shift in the Ve2 direction.

Figures 16A, 16B:
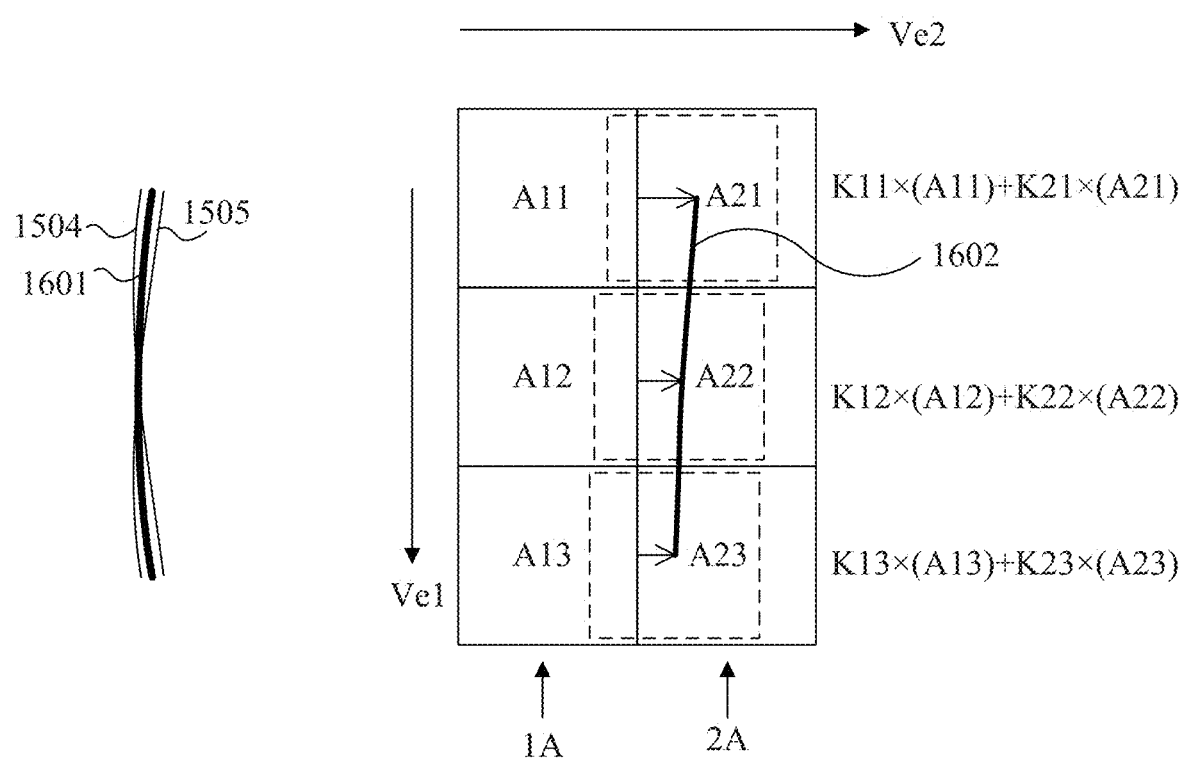
FIGS. 16A and 16B are views for explaining a distortion correction according to the fourth embodiment.

Referring now to FIGS. 16A and 16B, a description will be given of the correction of the pair of phase difference image signals (referred as a "distortion correction" hereinafter) about the shape shift in the Ve2 direction between the A image 1504 and the B image 1505 caused by the optical distortion. FIG. 16A illustrates that the A image 1504 and the B image 1505 do not overlap each other optical to the optical distortion, as described with reference to FIG. 15. The distortion correction corrects the phase difference image signal so that the A image 1504 and the B image 1505 overlap each other or form one line 1601. Herein, the distortion correction is made so that the A image 1504 and the B image 1505 form one line 1601 between them or the pair of phase difference mage signals correspond to the object images having distortions between a first distortion and a second distortion in the opposite directions of the A image 1504 and the B image 1505.

FIG. 16B illustrates an enlarged part of the pixel lines 1A and 2A illustrated in FIG. 15. In the distortion correction, a correction coefficient as a weighting coefficient is prepared for correction information applied to each of the two pixels adjacent to each other in the Ve2 direction among the pixel lines 1A and 2A. Each of the two adjacent pixels is multiplied by a mutually different correction coefficient, the multiplied results are added to each other, and a centroid 1602 of the phase difference image signal is moved in the Ve2 direction. In FIG. 16B, the pixel A11 in the pixel line 1A and the pixel A21 in the pixel line 2A are the two pixels that are adjacent to each other in the Ve2 line, and K11 and K12 are correction coefficients to be multiplied by these signal values. At this time, the position A1 of the centroid 1602 in the phase difference image signal after the distortion is correction is calculated by the weighting addition as in the following expression (3).

$$A1 = K11 \times (A11) + K21 \times (A21) \qquad (3)$$

The correction coefficients K11 and K21 are set as K11<K21 in this embodiment, and the position A1 of the corrected centroid 1602 is determined so that it overlaps the line 1601 illustrated in FIG. 16A. The correction coefficients K11 and K21 may be properly adjusted according to the position of the centroid 1602. The target may not necessarily be the line 1601 as long as the A image 1504 accords with the B image 1505. According to this embodiment, when the centroid 1602 is located on the pixel line 2A, K11<K21 is established, and when the centroid 1602 is located on the pixel line 1A, K11>K21 is established. The other pixel of the pixel lines 1A and 2A and the B image are similarly calculated. The correction coefficient for each pixel is previously calculated based on an optical design value of the re-imaging lenses 1303A and 1303B and stored in the EEPROM 1211. In the following description, the correction coefficient obtained based on the optical design value will be referred to as an optical correction coefficient.

When the distortion correction (shape difference correction) is performed such that the phase difference image signals corresponding to the A image 1504 and the B image 1505 having the optical distortions can be a phase difference image signal corresponding to the line 1601 between the A image 1504 and the B image 1505, a correction error can be reduced. Since changing amounts of the phase difference image signals are mutually equal to each other and the changing directions are opposite to each other, the correction coefficient for one of the pair of phase difference image signals is stored, and optical correction coefficients having opposite codes may be used for the pair of phase difference signals in the distortion correction. Thereby, a capacity necessary to store the optical correction coefficient may be restrained from increasing.

The example illustrated in FIG. 16A corrects a distortion so that the pair of phase difference image signals corresponding to the A image 1504 and the B image 1505 correspond to the line 1601 as a curve. Alternatively, the distortion correction may be made so that the pair of phase difference image signals corresponding to the A image 1504 and the B image 1505 correspond to a line near the A image 1504 and the B image 1505.

Figure 23:
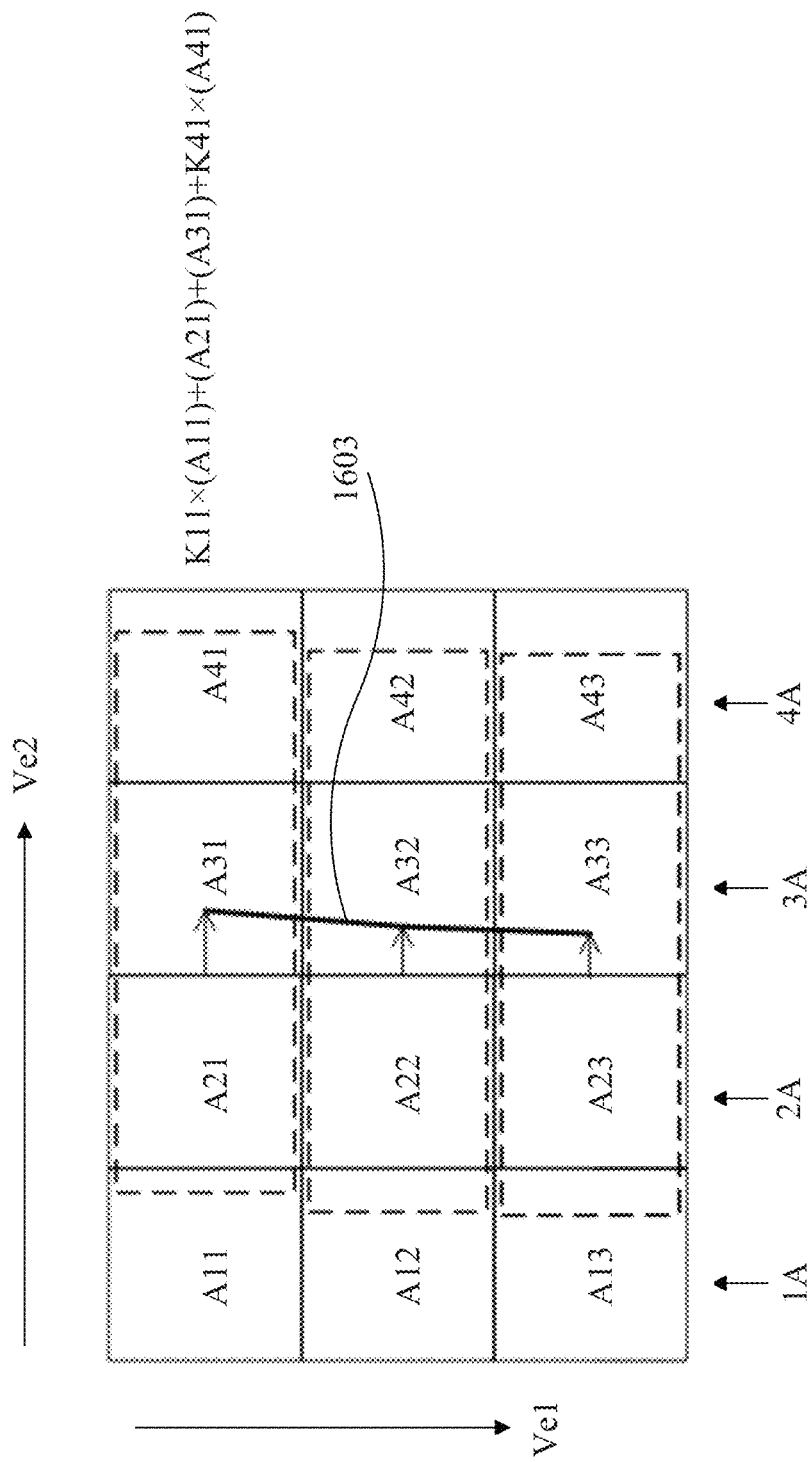
FIG. 23 is a view for explaining another distortion correction according to the fourth embodiment.

The centroid position of the phase difference image signal in the distortion correction may be calculated based on a method different from the expression (3). FIG. 23 illustrates an enlarged part of the pixel lines 1A to 4A. This embodiment multiplies the four pixels adjacent to each other in the Ve2 direction among the pixel lines 1A to 4A by the correction coefficient by the weighting coefficient, and sums up the multiplied results, and moves the centroid 1603 of the phase difference image signal in the Ve2 direction. In FIG. 23, the pixels A11, A21, A31, and A41 in the pixel lines 1A to 4A are four pixels adjacent to each other in the Ve2 direction and the correction coefficients for these signals are K11, K21, K31, and K41. The position A1 of the centroid 1603 in the phase difference image signal after the distortion is corrected is calculated by the weighting addition as in the following expression (4).

$$A1 = K11 \times (A11) + (A21) + (A31) + K41 \times (A41) \qquad (4)$$

For example, this embodiment sets the correction coefficients K21 and K31 to 1 and the correction coefficients K11 and K41 to K11<K41, and the position A1 of the corrected centroid 1603 is determined so that it overlaps the line 1601 illustrated in FIG. 16A. The correction coefficient determination method is not limited, and may be properly adjusted according to the generated distortion amount. The other pixel of the pixel lines 1A to 4A and the B image are similarly calculated. The correction coefficient for each pixel is previously calculated as an optical correction coefficient based on an optical design value of the re-imaging lenses 1303A and 1303B and stored in the EEPROM 1211. Since the two optical correction coefficients, such as K11 and K41, for the four pixels may be stored, a capacity necessary to store the optical correction coefficient may be restrained from increasing.

The weighing addition of signal values of pixels on two or more pixel lines adjacent to each other in the Ve2 direction corrects distortions in the pair of phase difference image signals corresponding to the A image 1504 and B image 1505 that shift in the Ve2 direction due to the optical distortion. A phase difference can be calculated through a correlation calculation with the corrected phase difference image signal, and a defocus amount can be calculated based on the phase difference. Thereby, the phase difference and defocus amount in which errors caused by the optical distortion are reduced can be calculated.

The two or more pixel lines may not be necessarily adjacent to each other in the Ve2 direction.

The phase difference may be calculated with a plane correlation calculation rather than the above so-called line correlation calculation. When the plane correlation calculation is used, the centroid of the phase difference image signal may be moved by sampling signal values in the pixels in the A image frame 1401A and the B image frame 1403 illustrated in FIG. 15. The overall phase difference A image frame 1401A and the B image frame 1403B after sampling in the Ve1 direction may be calculated. In this case, the EPROM 1211 stores the optical correction coefficients for all pixels in the A image frame 1401A and the B image frame 1403B. The following embodiment corrects the distortion and the line correlation calculation with the expression (3).

Only the distortion correction based on the optical design value cannot sufficiently correct shifts of the imaging positions of the A image and the B image which are caused by the assembly error and the component dimensional tolerance (or the relative position shift between the focus detection optical unit 1207 and the focus detection element 1304) in the focus detection optical unit 1207. As detailed later, the shifts of the imaging positions of the A image and the B image in the Ve2 direction may cause the pair of phase difference image signals to have a phase difference error in the Ve1 direction, which is to be corrected. The assembly error of the focus detection optical unit 1207 etc. may be different for each individual focus detection optical unit 1207.

This embodiment reduces the phase difference error between the pair of phase difference image signals by correcting the phase difference image signals for the shifts of the imaging positions of the A image and the B image, and thus sets the position correction coefficient for each individual focus detection optical unit 1207. The position correction coefficient is correction information applied to each of the two pixels that are adjacent to each other in the Ve2 direction similar to the optical correction coefficient. A setting method of the position correction coefficient will be described with reference to FIGS. 17 to 20.

Figure 17:
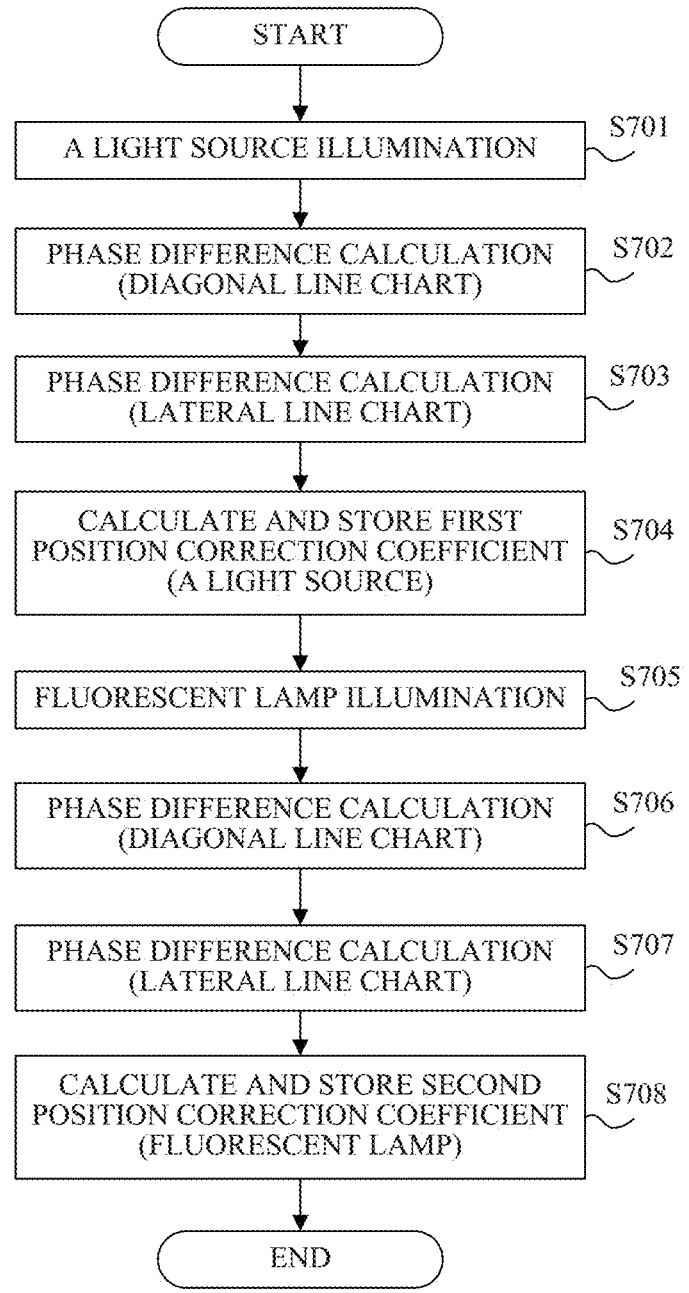
FIG. 17 is a flowchart of a correction coefficient setting process according to the fourth embodiment.

A flowchart in FIG. 17 illustrates a setting process of the position correction coefficient according to this embodiment. This process is actually performed in an inspection process after the focus detection optical unit 1207 is assembled and installed in the image capturing apparatus in a factory. In this case, the image capturing apparatus uses an inspecting image-capturing lens. The focus detection optical unit 1207 alone may be calibrated with the inspecting image-capturing apparatus before the focus detection optical unit 1207 is installed in the image capturing apparatus. The inspection process may be performed with an inspection apparatus, such as a PC, or with the image capturing apparatus.

The step S701 sets an A light source (first light source) that provides illumination light to a variety of charts, which will be described later. The A light source is a light source that emits light with a wavelength near that of the incandescent lamp or the sun.

Next, the step S702 performs the phase difference AF for a diagonal line chart through an inspecting image-capturing apparatus. The camera CPU 1210 in the inspecting image-capturing apparatus calculates a phase difference from the pair of phase difference image signals obtained by the focus detection element 1304. As described above, the EEPROM in the inspecting image-capturing apparatus previously stores the optical correction coefficient obtained based on the optical design value. After the distortion of the pair of phase difference image signals is corrected with the optical correction coefficient and the expression (3), the camera CPU calculates the phase difference between the pairs of corrected phase difference image signals (referred to as a "diagonal line phase difference" hereinafter).

Figure 18:
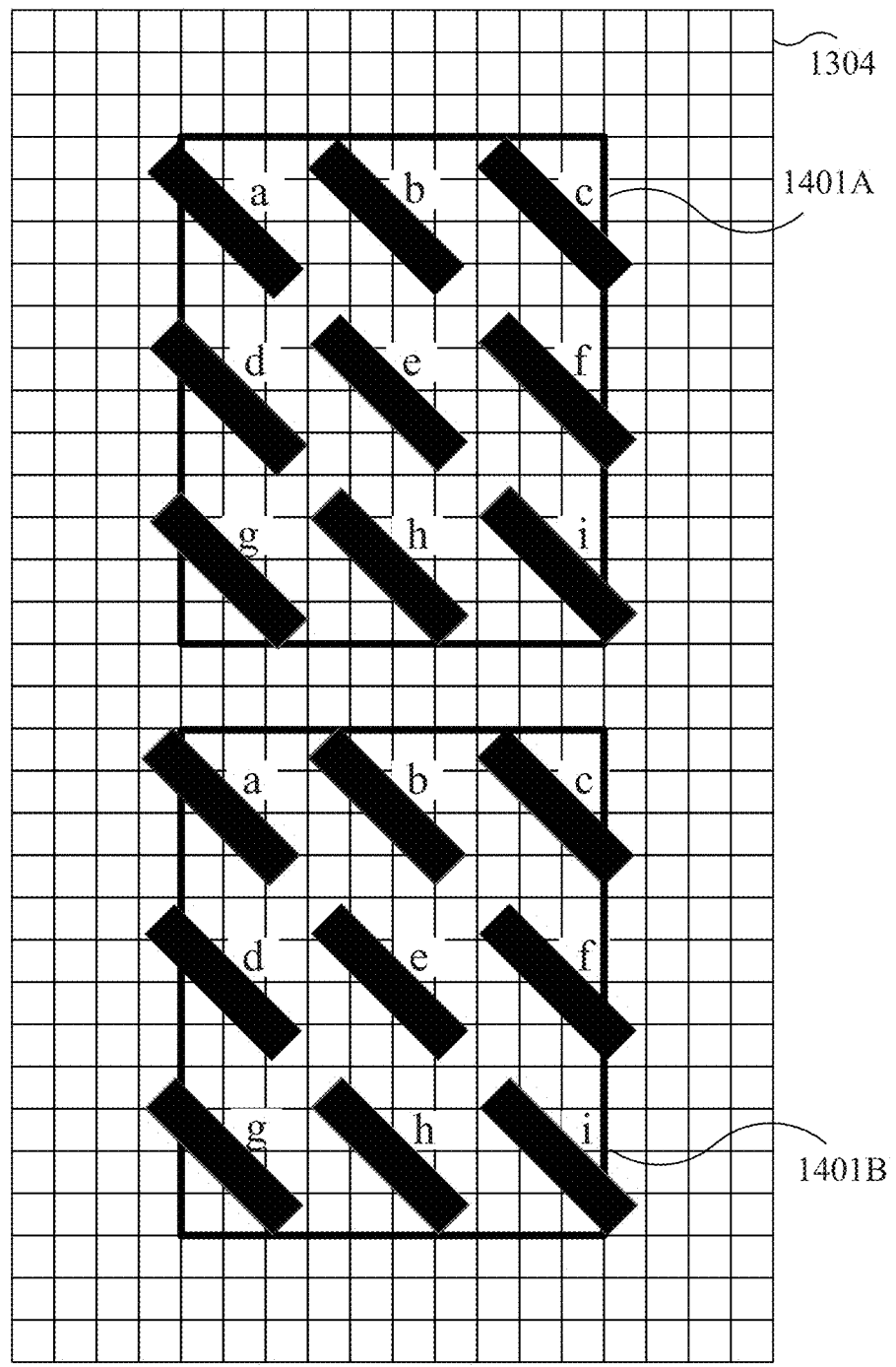
FIG. 18 illustrates a diagonal line chart image formed on the focus detection element according to the fourth embodiment.

FIG. 18 illustrates an imaging state on the focus detection element 1304 of the image of the diagonal line chart (chart image). The diagonal chart images are imaged at the nine positrons a to i in each of the A image frame 1401A and the B image frame 1403B. In the diagonal line chart, the reflectance in black is higher than that of another part.

Figure 19:
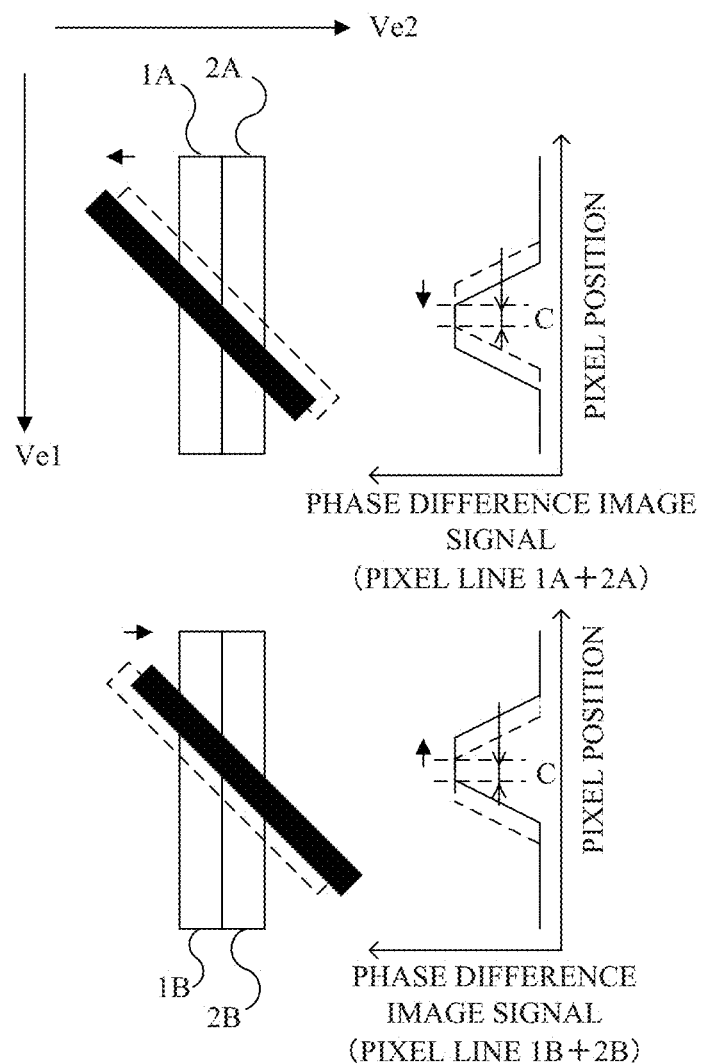
FIG. 19 illustrates a relationship between the diagonal line chart image position and a phase difference image signal on two pixel lines on the focus detection element.

FIG. 19 illustrates a relationship between the positions of the chart images (A image and B image) on the pixel lines 1A, 2A, 1B, and 2B on the individual focus detection optical unit 1207 and the pair of phase difference image signals obtained from these pixel lines.

The A image and the B image are formed as actual chart images illustrated in black on the pixel lines 1A, 2A, 1B, and 2B illustrated on the left side in FIG. 19. Each broken line illustrates the positions of the A image and the B image as virtual chart images corresponding to the phase difference image signals after the distortion is corrected. Each broken line on the right side in FIG. 19 illustrates a phase difference image signal made by adding signals obtained from the pixel lines 1A and 2A to each other in the A image after the distortion is corrected, and a phase difference image signal made by adding signals obtained from the pixel lines 1B and 2B to each other in the B image after the distortion is corrected. On the left side in FIG. 19, the actual position of the A image on the pixel lines 1A and 2A moves in the −Ve2 direction from the position of the A image after the distortion is corrected. The actual position of the B image on the pixel lines 1B and 2B moves in the +Ve2 direction from the position of the A image after the distortion is corrected.

As a result, as illustrated on the right side in FIG. 19, each of (the centroid of) the phase difference image signal corresponding to the A image and (the centroid of) the phase difference image signal corresponding to the B image moves from a position illustrated by a broken line to a position illustrated by a solid line in the Ve1 direction to the side illustrated by an arrow by a movement amount C. Thus, the diagonal line phase difference calculated based on the pair of phase difference image signals illustrated by the solid lines has an error. Since the movement amount C of the phase difference image signal is different according to the imaging position, the camera CPU calculates the diagonal line phase difference based on each of the pair of phase difference image signals obtained from the nine positions a to i described in FIG. 18.

Next, the step S703 performs the phase difference AF for the lateral line chart through the inspecting image-capturing apparatus. Similarly, after the distortion of the pair of phase difference image signals is corrected with the optical correction coefficient and the expression (3), the camera CPU calculates the phase difference between the pair of corrected phase difference image signals (referred to as a "lateral line phase difference" hereinafter). The camera CPU calculates the lateral line phase difference at the same nine positions a to i as those in the step S702.

Figure 20:
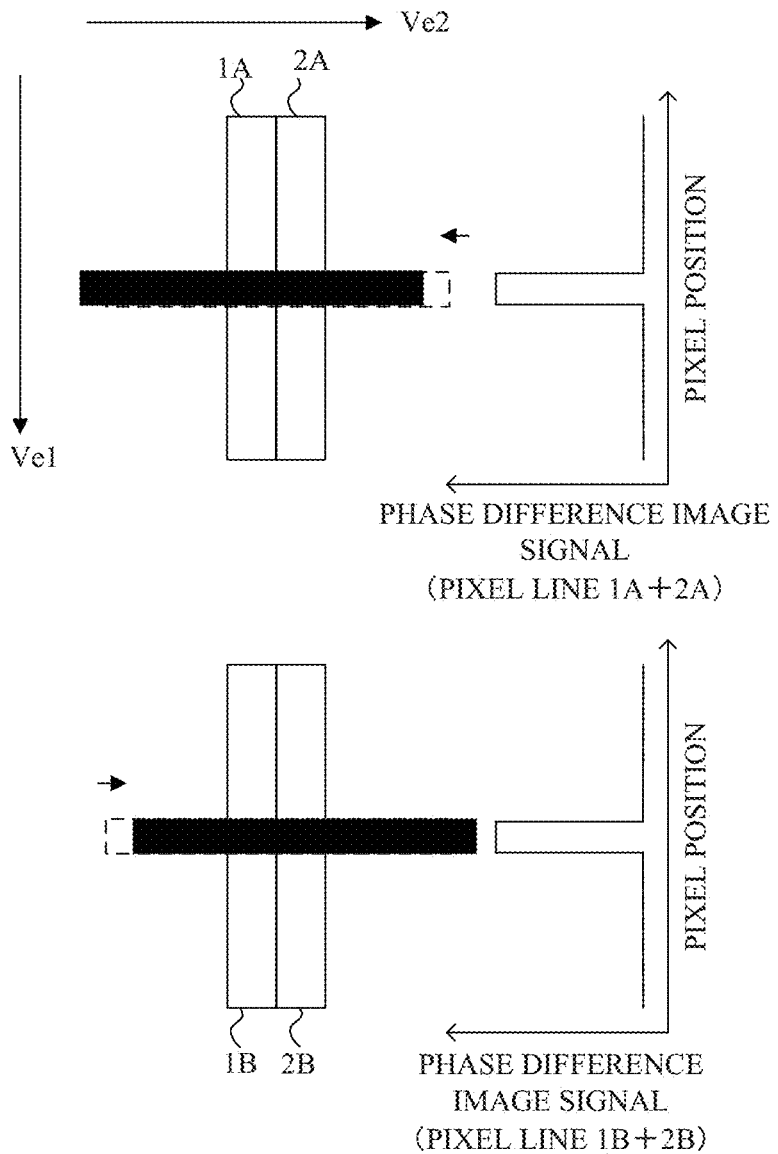
FIG. 20 illustrates a relationship between a lateral line chart image position and a phase difference image signal on the two pixel lines on the focus detection element.

FIG. 20 illustrates a relationship between the positions of the chart images (A image and B image) on the pixel lines 1A, 2A, 1B, and 2B on the same focus detection optical unit 1207 as that in FIG. 19, and the pair of phase difference image signal obtained by these pixel lines.

The A image and the B image are formed as actual chart images illustrated in black on the pixel lines 1A, 2A, 1B, and 2B illustrated on the left side in FIG. 20. Each broken line illustrates the positions of the A image and the B image as virtual chart images corresponding to the phase difference image signals after the distortion is corrected. Each broken line on the right side in FIG. 20 illustrates a phase difference image signal made by adding signals obtained from the pixel lines 1A and 2A to each other in the A image after the distortion is corrected, and a phase difference image signal made by adding signals obtained from the pixel lines 1B and 2B to each other in the B image after the distortion is corrected. Similar to FIG. 19, on the left side in FIG. 20, the actual position of the A image on the pixel lines 1A and 2A moves in the −Ve2 direction from the position of the A image after the distortion is corrected. The actual position of the B image on the pixel lines 1B and 2B moves in the +Ve2 direction from the position of the A image after the distortion is corrected.

However, as illustrated on the right side in FIG. 20, (the centroid of) the phase difference image signal corresponding to the A image and (the centroid of) the phase difference image signal do not move in the Ve1 direction. Hence, in case of the lateral line chart, different from the diagonal line chart, the phase (or the lateral line phase difference) does not chance even when the imaging positions of the A image and the B image move in the Ve2 direction.

Next, in the step S704, the camera CPU calculates the movement amount C of the centroid of the phase difference image signal illustrated in FIG. 19 based on a difference between the diagonal line phase difference obtained in the step S702 and the lateral phase difference obtained in the step S703. The camera CPU calculates the first position correction coefficient as the position correction coefficient under the A light source based on the centroid movement amount C. For example, when the centroid movement amount C is half a pixel (0.5 pixels), the camera CPU calculates the first position correction coefficient that moves the centroid position of the phase difference image signal corrected with the optical correction coefficient such that the centroid of the phase difference image signal corresponding to the A image is moved by a quarter pixel (0.25 pixels) and the centroid of the phase difference image signal corresponding to the B image is moved by a minus quarter pixel (−0.25 pixels).

Figure 21:
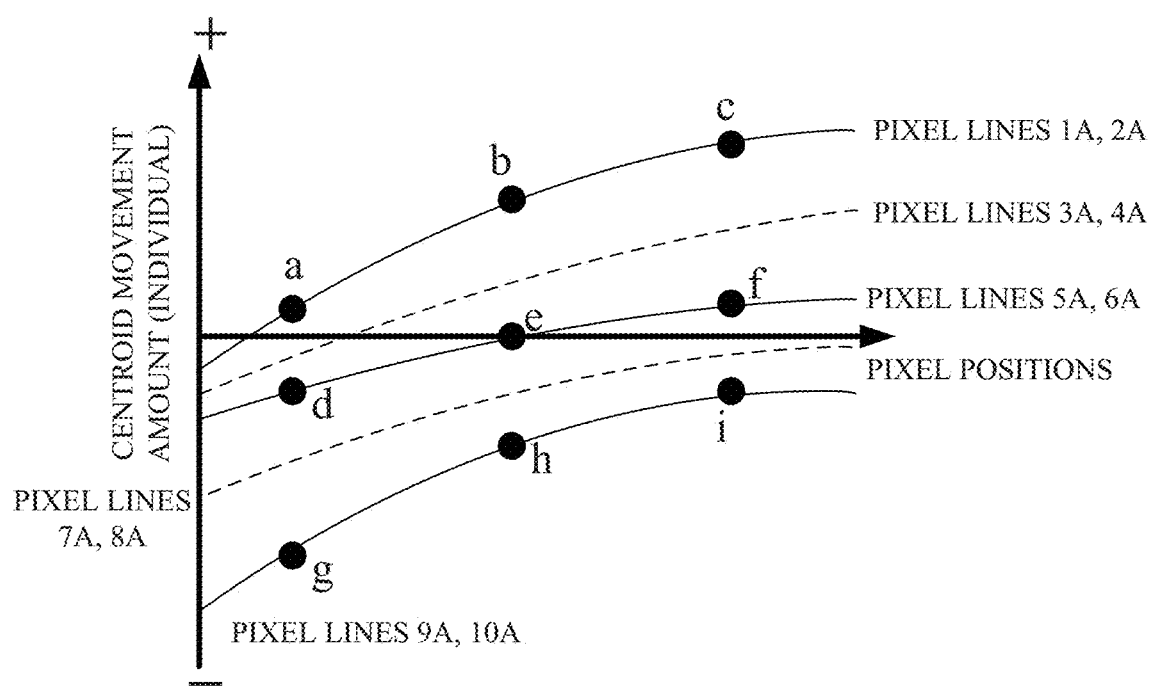
FIG. 21 illustrates a distribution of a centroid movement amount of the A image on the focus detection element according to the fourth embodiment.

FIG. 21 illustrates the centroid movement amount of the A image at the nine positions by black dots. The camera CPU calculates the centroid movement amount for each pixel on the pixel lines 1A and 2A through a correlation calculation to the centroid movement amount at the other position with a secondary approximate expression made by approximating the centroid movement amount at the positions a to c, converts it into the first position correction coefficient, and stores it in the EEPROM 1211. Moreover, the camera CPU calculates the centroid movement amount for each pixel on the pixel lines 3A and 4A through a correlation calculation to the centroid movement amount at the other position with a secondary approximate expression made by approximating the centroid movement amount at the positions d to f, converts it into the first position correction coefficient, and stores it in the EEPROM 1211. Similarly, the camera CPU calculates the centroid movement amount for each pixel on the pixel lines 5A and 6A through a correlation calculation to the centroid movement amount at the other position with a secondary approximate expression made by approximating the centroid movement amount at the positions g to i, converts it into the first position correction coefficient, and stores it in the EEPROM 1211.

The camera CPU sets an intermediate value of the centroid movement amounts at the positions a to c and at the position d to f to a centroid movement amount on the pixel lines 3A and 4A, converts the intermediate value into the first position correction coefficient, and stores it into the EEPROM 1211. The camera CPU sets an intermediate value of the centroid movement amounts at the positions d to f and the position g to i to a centroid movement amount on the pixel lines 7A and 8A, converts the intermediate value into the first position correction coefficient, and stores it into the EEPROM 1211.

Next, in the step S705, the camera CPU sets the fluorescent lamp (second light source) that provides illumination light to a variety of charts. The camera CPU performs the steps S706 and S707 similarly to the steps S702 and S703 under the fluorescent lamp.

In the step S708, the camera CPU calculates the centroid movement amount of the phase difference image signal based on the difference between the diagonal line phase difference obtained in the step S702 and the lateral line phase difference obtained in the step S703 under the fluorescent lamp. Similar to the step S704, the camera CPU calculates the centroid movement amounts of the pixel lines 1A to 10A through an interpolation calculation based on the centroid movement amounts at the nine positions a to i, converts it into a second position correction coefficient as the position correction coefficient under the fluorescent lamp, and stores it into the EEPROM 1211.

Thus, in order to corrects a fluctuation of the imaging position caused by the assembly error and the component dimensional tolerance which cannot be corrected only by the optical correction coefficient, this embodiment calculates and stores the first and second correction coefficients for each individual focus detection optical unit 1207. In addition, in order to correct a fluctuation caused by the light source that illuminates the object, this embodiment sets the position correction coefficient for the A light source to the first position correction coefficient, and the position correction coefficient for the fluorescent lamp different from the light source to the second position correction coefficient, and calculates and stores the first and second position correction coefficients for each individual focus detection optical unit 1207. In this way, the EEPROM 1211 stores the optical correction coefficient that is not affected by the individual focus detection optical unit 1207, and the first and second position correction coefficients for each individual focus detection optical unit 1207.

Figure 22:
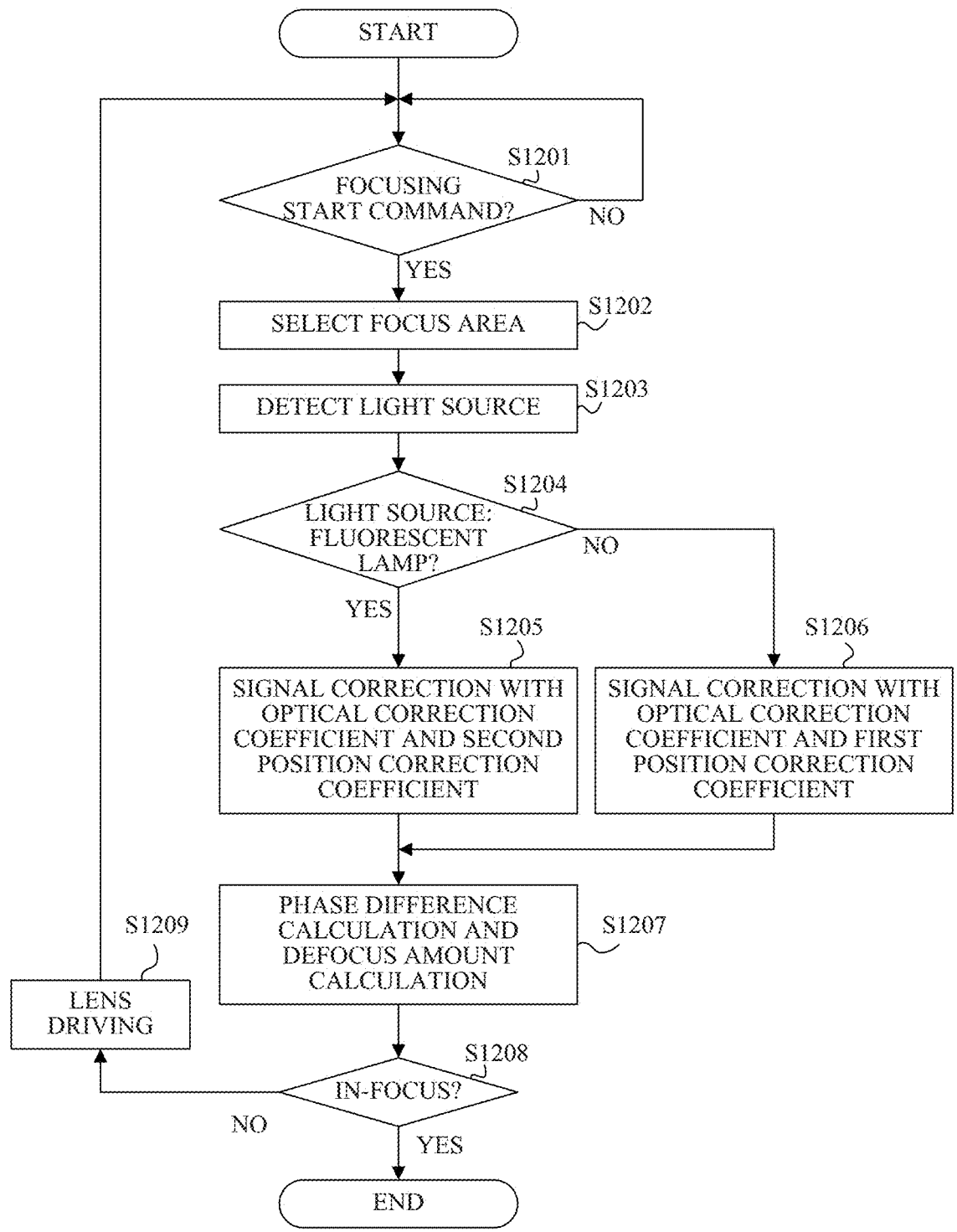
FIG. 22 is a flowchart of a focus control process according to the fourth embodiment.

A flowchart in FIG. 22 illustrates a focus control process performed by the camera CPU 1210 in the in-focus state of the image capturing lens 1100 according to this embodiment. The camera CPU 1210 that serves as a computer executes this process according to the focus control program (including the focus detection program) as a computer program.

In the step S1201, the camera CPU 1210 determines whether there is a focusing start command by the user operation via the operation detector 1213. The camera CPU 1210 moves to the step 1202, when there is the focusing start command.

In the step S1202, the camera CPU 1210 selects a pixel line used to detect a focus state among the pixel lines 1A to 10A and 1B to 10B according to a selection of the focus detection area in an image capturing range (angle of view). More specifically, the camera CPU 1210 selects two pixel lines that are adjacent to each other in the Ve2 direction and contained in the selected focus detection area. The two pixel lines adjacent to each other are selected so as to correct the distortion with the expression (3) later.

Next, in the step S1203, the camera CPU 1210 detects a type of the illumination light (or light source) based on a measurement result of the photometry unit 1214. In the step S1204, the camera CPU 1210 determines whether the light source detected in the step S1203 is a fluorescent lamp. When the light source is the fluorescent lamp, the camera CPU 1210 moves to the step S1205. When the light source is not the fluorescent lamp, the camera CPU 1210 moves to the step S1206.

In the step S1205, the camera CPU S1210 generates pairs of phase difference image signals by using the signals from the two pixel lenses selected in the step S1202. The camera CPU 1210 reads (obtains) the optical correction coefficient and the second position correction coefficient for the fluorescent lamp corresponding to the selected pixel lines, out of the EEPROM 1211. The camera CPU 1210 correct the pair of phase difference image signals with the optical correction coefficient, the second position correction coefficient, and the expression (3). Thereby, the camera CPU 1210 can correct the phase difference image signal in the Ve2 direction. In other words, the camera CPU 1210 can generate the pair of phase difference image signals in which the phase difference error is corrected in the Ve1 direction which depends on a difference between the A image and the B image in the Ve2 direction.

For example, assume that the optical correction coefficients for the signal values of the pixel A11 on the pixel line 1A and the pixel A21 on the pixel line 2A are K11 and K21, and the second correction coefficients are KF11 and KF21. Then, the centroid position A1 in the corrected phase difference image signal becomes as follows.

$A1=(K11 \times KF11) \times A11+(K21 \times KF21) \times A21$

In the step S1206, the camera CPU 1210 generates a pair of phase difference image signals by using the signals from the two pixel lines selected in the step S1202. The camera CPU 1210 reads (obtains) the optical correction coefficient and the first position correction coefficient for the A light source corresponding to the selected pixel lines, out of the EEPROM 1211. The camera CPU 1210 corrects the pair of phase difference image signals by using the optical correction coefficient, the first position correction coefficient, and the expression (3). Thereby, the phase difference image signal can be corrected in the Ve2 direction. In other words, the camera CPU 1210 can generate the pair of phase difference image signals in which the phase difference error is corrected in the Ve1 direction which depends on the difference between the A image and the B image in the Ve2 direction.

For example, assume that the optical correction coefficients for the signal values of the pixel A11 on the pixel line 1A and the pixel A21 on the pixel line 2A are K11 and K21, and the first correction coefficients are KF11 and KF21. Then, the centroid position A1 in the corrected phase difference image signal becomes as follows.

$A1=(K11 \times KA11) \times A11+(K21 \times KA21) \times A21$

The camera CPU 1210 may add the first and second correction coefficients to the optical correction coefficient instead of multiply the optical correction coefficient by the first and second optical correction coefficients.

The A light source is a light source configured to emit light with a wavelength near that of the incandescent lamp or the sun, as described above, the first position correction coefficient can be used to correct the phase difference image signal under a light source other than the fluorescent lamp. The steps S1205 and S1206 correspond to the signal generating step or the signal generating process.

Next, in the step S1207, the camera CPU 1210 calculates a phase difference between the pair of phase difference image signals corrected in the step S1205 or S1206, and calculates the defocus amount based on the phase difference. This step S1207 corresponds to the calculating step or calculating process.

Next, in the step S1208, the camera CPU 1210 determines whether the defocus amount calculated in the step S1207 is equal to or lower than an in-focus determination value def1 or whether the image capturing lens 1100 is in the in-focus state. The in-focus determination value def1 is, for example, a value equal to or smaller than $1/4F\delta$. F is an F-number of the image capturing lens 1100, and $\delta$ is a constant, such as 20 μm. For example, def1=10 μm in the open aperture state with F2.0 of the image capturing lens 1100. When the defocus amount is equal to or smaller than def1, the image capturing lens 1100 is in the in-focus state and thus the camera CPU 1210 ends this process. When the defocus amount is larger than def1, the camera CPU 1210 moves to the step 1209.

In the step S1209, the camera CPU 1210 communicates with the lens CPU 1103, and controls the lens driving mechanism 1102 and drives the focus lens 1101 based on the defocus amount calculated in the step S1207. Thereby, the focus lens 1101 is moved to the in-focus position. When driving of the focus lens 1101 ends, the camera CPU 1210 returns to the step S1201 and the above process is repeated until the in-focus state is determined in the step S1208.

This embodiment can restrain the focus detection precision from decreasing when a pair of A image and B image fluctuate in the Ve2 direction orthogonal to the correlation direction (Ve1 direction) due to the optical aberration, the assembly error, the component dimensional tolerance, etc. in the focus detection optical unit 1207. Thereby, this embodiment can provide a focus control apparatus that can provide a more precise focus detection and an image capturing apparatus having the same.

The fourth embodiment corrects the pair of phase difference signals by using both the optical correction coefficient and the position correction coefficient, but may corrects the pair of phase difference signals by using at least one of the optical correction coefficient and the position correction coefficient.

The fourth embodiment can restrain the focus detection precision from decreasing due to shifts of a pair of object images in the second direction orthogonal to the first direction used to acquire the phase difference.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims to be accorded the broadest interpretation so as to encompass all such modifications and equivalent structures and functions.

This application claims the benefit of Japanese Patent. Applications Nos. 2016-120384, filed on Jun. 17, 2016 and 2017-036948, filed on Feb. 28, 2017, each of which is hereby incorporated by reference herein in its entirety.

What is claimed is:

1. A focus detection apparatus configured to detect a focus state of an image capturing optical system by using a phase difference between a pair of phase difference image signals obtained by photoelectrically converting, through a focus detection element, a pair of object images which are formed by dividing a light flux from an image capturing optical system, the focus detection element including a plurality of photoelectric converters that are two-dimensionally arranged in a first direction in which a distance between the pair of object images changes according to the focus state, and a second direction orthogonal to the first direction, the focus detection apparatus comprising:
- a memory that stores instructions; and
- a processor that executes the instructions stored in the memory to:
  - acquire a first distance as the distance in the first direction based on the pair of phase difference image signals;
  - acquire a correction value corresponding to a second distance as the distance between the pair of object images in the second direction; and
  - calculate the phase difference using the first distance and the correction value.

2. The focus detection apparatus according to claim 1, wherein the focus detection element includes a detection area in which two or more photoelectric converters are arranged in the first direction, the detection area including a first detection area configured to photoelectrically convert one of the pair of object images, a second detection area configured to photoelectrically convert the other of the pair of object images, and a third detection area located at a position in the second direction relative to the second detection area and configured to photoelectrically configure the other of the pair of object images,
- wherein the processor reads an electric charge in the first direction out of the first detection area and generates a first phase difference image signal reads an electric charge in the first direction out of the second detection area and generates a second phase difference image signal, and reads an electric charge in the first direction out of the third detection area and generates a third phase difference image signal,
- wherein the processor calculates a distance A as the first distance by using the first phase difference image signal and the second phase difference image signal, the processor calculates a distance Bas the first distance by using the first phase difference image signal and the third phase difference image signal, and
- wherein the processor calculates the phase difference through an interpolation calculation using the distance A, the distance B, and the correction value.

3. The focus detection apparatus according to claim 1, wherein the processor further executes an instruction to store, as a first correction value, the correction value previously acquired by the processor,
- wherein the processor calculator calculates the phase difference by using the first distance and the first correction value.

4. The focus detection apparatus according to claim 3, wherein the processors reads electric charge in the second direction out of each of a pair of detection areas which includes two or more photoelectric converters arranged in the second direction in the focus detection element, generates a pair of distance calculating image signals, and calculates a second correction value as the correction value by using the pair of distance calculating image signals, and
- wherein the processor calculates the phase difference by using the first distance and the second correction value.

5. The focus detection apparatus according to claim 4, wherein the processor further executes an instruction to store a first correction value as the correction value previously acquired by the processor,
- wherein the processor selects one of the first correction value and the second correction value according to a result of determining reliability of the distance calculating image signals and uses the one of the first and second correction values to calculate the phase difference.

6. The focus detection apparatus according to claim 4, wherein the processor selects the pair of detection areas based on the first distance.

7. The focus detection apparatus according to claim 3, wherein the processor selects the first correction value when reliability of the other distance is lower than a threshold.

8. The focus detection apparatus according to claim 5, wherein the processor stores, as a new first correction value, the second correction value.

9. The focus detection apparatus according to claim 1, wherein the processor calculates a first phase difference as the phase difference by using the first distance without using the correction value, and calculates a second phase difference as the phase difference by using the first distance and the correction value after a focus lens in the image capturing optical system is driven based on the first phase difference.

10. A focus control apparatus comprising a focus detection apparatus configured to detect a focus state of an image capturing optical system by using a phase difference between a pair of phase difference image signals obtained by photoelectrically converting, through a focus detection element, a pair of object images which are formed by dividing a light flux from an image capturing optical system, the focus detection element including a plurality of photoelectric converters that are two-dimensionally arranged in a first direction in which a distance between the pair of object images changes according to the focus state, and a second direction orthogonal to the first direction; and
- a controller configured to control driving of a focus lens in the image capturing optical system based on the phase difference,
- wherein the focus detection apparatus includes:
- a memory that stores instructions; and
- a processor that executes the instructions stored in the memory to:
  - acquire a first distance as the distance in the first direction based on the pair of phase difference image signals;
  - acquire a correction value corresponding to a second distance as the distance between the pair of object images in the second direction; and
  - calculate the phase difference using the first distance and the correction value.

11. An image capturing apparatus comprising:
- an image sensor configured to capture an object image; and
- a focus control apparatus that includes:
  - a focus detection apparatus configured to detect a focus state of an image capturing optical system by using a phase difference between a pair of phase difference image signals obtained by photoelectrically converting, through a focus detection element, a pair of object images which are formed by dividing a light flux from an image capturing optical system, the focus detection element including a plurality of photoelectric converters that are two-dimensionally arranged in a first direction in which a distance between the pair of object images changes according to the focus state, and a second direction orthogonal to the first direction; and
  - a controller configured to control driving of a focus lens in the image capturing optical system based on the phase difference, and
  - wherein the focus detection apparatus includes:
  - a memory that stores instructions; and a processor that executes the instructions stored in the memory to:
acquire a first distance as the distance in the first direction based on the pair of phase difference image signals;
acquire a correction value corresponding to a second distance as the distance between the pair of object images in the second direction; and
calculate the phase difference using the first distance and the correction value.

12. A focus detection method configured to detect a focus state of an image capturing optical system by using a phase difference between a pair of phase difference image signals obtained by photoelectrically converting, through a focus detection element, a pair of object images which are formed by dividing a light flux from an image capturing optical system, the focus detection element including a plurality of photoelectric converters that are two-dimensionally arranged in a first direction in which a distance between the pair of object images changes according to the focus state, and a second direction orthogonal to the first direction, the focus detection method comprising the steps of:
acquiring a first distance as the distance in the first direction based on the pair of phase difference image signals;
acquiring a correction value corresponding to a second distance as the distance between the pair of object images in the second direction; and
calculating the phase difference using the first distance and the correction value.

13. A computer-readable storage medium for storing a program that enables a computer to execute a focus detection method configured to detect a focus state of an image capturing optical system by using a phase difference between a pair of phase difference image signals obtained by photoelectrically converting, through a focus detection element, a pair of object images which are formed by dividing a light flux from an image capturing optical system, the focus detection element including a plurality of photoelectric converters that are two-dimensionally arranged in a first direction in which a distance between the pair of object images changes according to the focus state, and a second direction orthogonal to the first direction, the focus detection method comprising the steps of:
acquiring a first distance as the distance in the first direction based on the pair of phase difference image signals;
acquiring a correction value corresponding to a second distance as the distance between the pair of object images in the second direction; and
calculating the phase difference using the first distance and the correction value.

14. A focus detection apparatus configured to detect a focus state of an image capturing optical system by photoelectrically converting, through a focus detection element, a pair of object images which are formed by a focus detection optical system configured to divide a light flux from the image capturing optical system, the focus detection element including a plurality of photoelectric converters that are two-dimensionally arranged in a first direction and a second direction orthogonal to the first direction, the focus detection apparatus comprising:
a memory that stores instructions; and
a processor that executes the instructions stored in the memory to:
generate a pair of phase difference image signals by using an output from the focus detection element; and
calculate a phase difference in the first direction between the pair of the phase difference image signals and to obtain the focus state based on the phase difference,
wherein the processor corrects the pair of phase difference image signals about a shift of at least one of a shape and a position based on a distance determined between the pair of object images in the second direction.

15. The focus detection apparatus according to claim 14, wherein the shift is caused by at least one of an aberration of the focus detection optical system and a relative position shift between the focus detection optical system and the focus detection element.

16. The focus detection apparatus according to claim 14, wherein the processor provides a correction so as to reduce a shape difference between the pair of phase difference image signals according to a shift between shapes of the pair of object images in the second direction.

17. The focus detection apparatus according to claim 16, wherein the shift between the shapes is caused by a first distortion and a second distortion which the pair of object images possess on sides opposite to each other in the second direction, and
wherein the processor provides a correction so that each of the pair of phase difference image signals is a phase difference image signal corresponding to an object image having a distortion between the first distortion and the second distortion.

18. The focus detection apparatus according to claim 14, wherein the processor provides a correction so as to reduce a phase difference error between the pair of phase difference image signals in the first direction according to the shift of the position in the second direction between the pair of object images.

19. The focus detection apparatus according to claim 15, wherein the processor provides a correction by obtaining correction information on at least one of the aberration and the relative position shift, and by applying the correction information to a signal obtained from each of the plurality of photoelectric converters.

20. The focus detection apparatus according to claim 19, wherein the processor provides a correction through a weighting addition by multiplying the signal obtained from each of the plurality of photoelectric converts by a weighting coefficient as the correction information.

21. The focus detection apparatus according to claim 19, wherein the processor determines a type of a light source configured to illuminate an object, and uses the correction information according to the type of the light source.

* * * * *